(12) United States Patent
Kodama et al.

(10) Patent No.: US 7,505,388 B2
(45) Date of Patent: Mar. 17, 2009

(54) LASER CONTROLLER FOR A MULTI-INTENSITY RECORDING LASER AND AN OPTICAL DISK DRIVE INCLUDING THE SAME

(75) Inventors: Kunihiko Kodama, Kanagawa (JP);
Takashi Inoue, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 506 days.

(21) Appl. No.: 10/876,658

(22) Filed: Jun. 28, 2004

(65) Prior Publication Data
US 2005/0025031 A1 Feb. 3, 2005

(30) Foreign Application Priority Data
Jun. 30, 2003 (JP) .............................. 2003-187039
Jan. 26, 2004 (JP) .............................. 2004-017263

(51) Int. Cl.
*G11B 7/0045* (2006.01)
(52) U.S. Cl. ..................................... 369/59.11; 369/116
(58) Field of Classification Search .............. 369/59.11, 369/116, 53.36; 372/38.02, 38.07, 38.1
See application file for complete search history.

(56) References Cited
U.S. PATENT DOCUMENTS 5,218,591 A * 6/1993 Shimamoto et al. ...... 369/53.31
6,954,415 B2 * 10/2005 Masui et al. .............. 369/59.11
2002/0172242 A1 * 11/2002 Seo .......................... 372/29.02
2002/0186628 A1 * 12/2002 Hoshino et al. ............ 369/47.3
2003/0193867 A1 * 10/2003 Furukawa et al. ........ 369/59.11
2005/0025031 A1   2/2005 Kodama et al.
2005/0259555 A1 * 11/2005 Miyamoto et al. .......... 369/116

FOREIGN PATENT DOCUMENTS

| JP | 8-147697 | | 6/1996 |
|---|---|---|---|
| JP | 11-219524 | | 8/1999 |
| JP | 11219524 A | * | 8/1999 |
| JP | 11-283249 | | 10/1999 |
| JP | 2000-216470 | | 8/2000 |
| JP | 2002-298418 | | 10/2002 |
| JP | 2003-132571 | | 5/2003 |

OTHER PUBLICATIONS

U.S. Appl. No. 10/876,658, filed Jun. 28, 2004, Kodama et al.
U.S. Appl. No. 11/001,018, filed Dec. 02, 2004, Kodama.
U.S. Appl. No. 11/616,576, filed Dec. 27, 2006, Inoue, et al.

* cited by examiner

*Primary Examiner*—Wayne R Young
*Assistant Examiner*—LaTanya Bibbins
(74) *Attorney, Agent, or Firm*—Oblon, Spivak, McClelland, Maier & Neustadt, P.C.

(57) ABSTRACT

A laser controller includes a timing signal generator configured to generate a timing signal for controlling the irradiation timing of the laser in accordance with input data. A mask signal generator is configured to generate a mask timing signal for masking the timing signal in accordance with the input data.

16 Claims, 28 Drawing Sheets

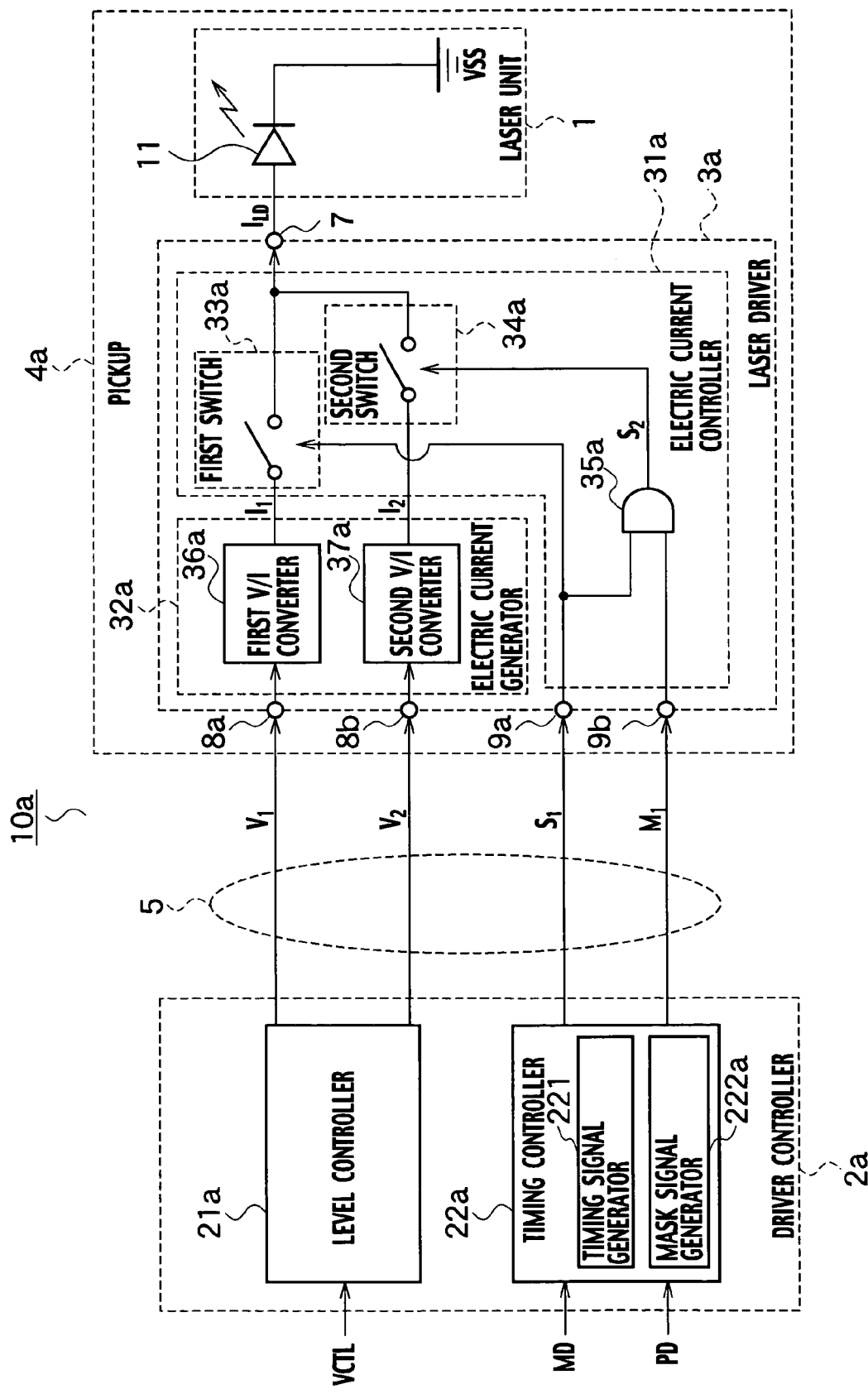

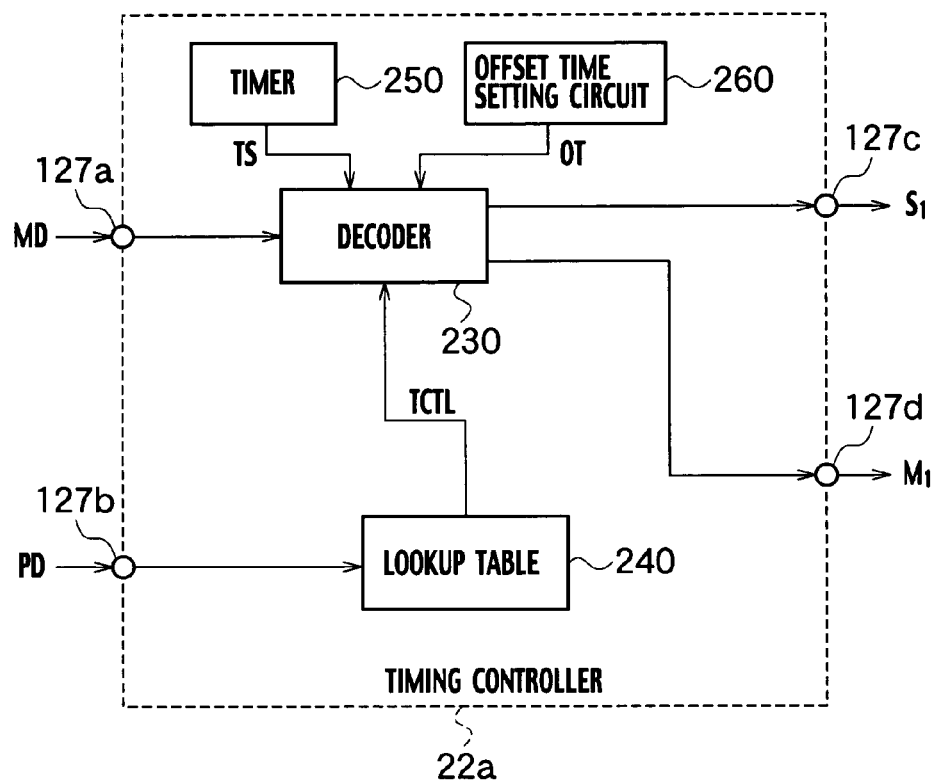
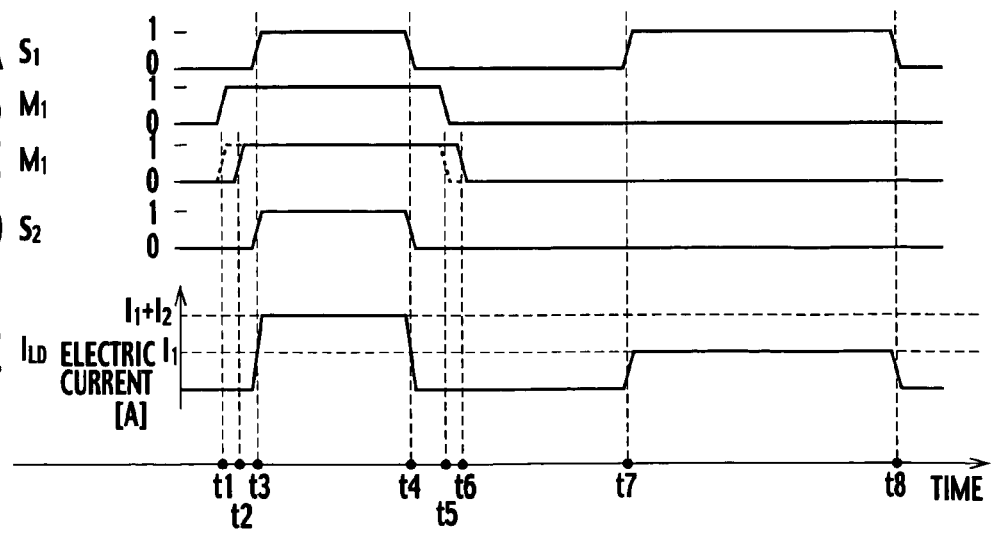

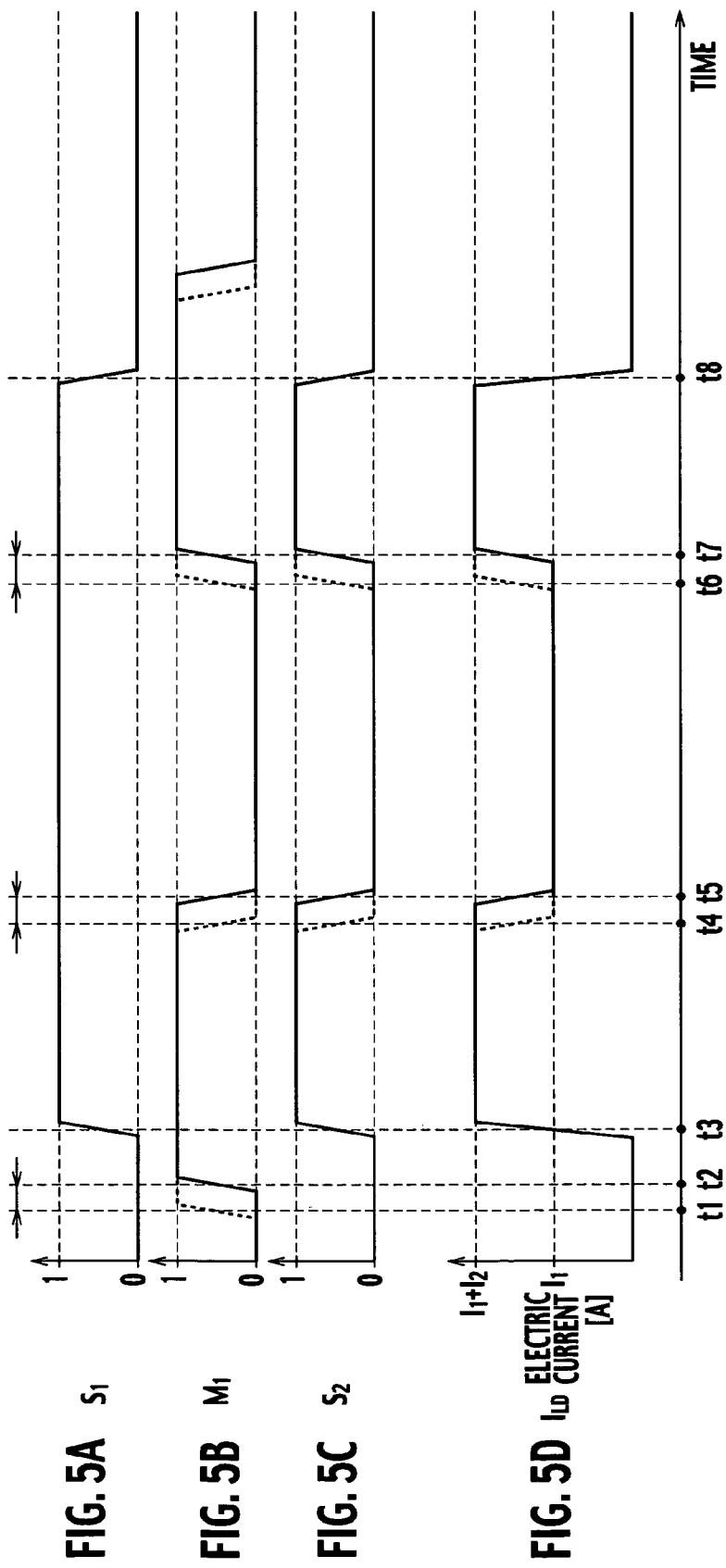

FIG. 20

| $C_1$ | $C_2$ | $M_1$ | $M_2$ | $M_3$ |
|---|---|---|---|---|
| 0 | 0 | 0 | 0 | 0 |
| 0 | 1 | 1 | 0 | 0 |
| 1 | 0 | 1 | 1 | 0 |
| 1 | 1 | 1 | 1 | 1 |

FIG. 23

| $C_1$ | $C_2$ | $M_1$ | $M_2$ | $M_3$ | $M_4$ |
|---|---|---|---|---|---|
| 0 | 0 | 1 | 0 | 0 | 0 |
| 0 | 1 | 0 | 1 | 0 | 0 |
| 1 | 0 | 0 | 0 | 1 | 0 |
| 1 | 1 | 0 | 0 | 0 | 1 |

FIG. 26

| $C_{1b}$ | $C_{2b}$ | $S_2$ | $S_3$ | $S_4$ | $S_5$ |
|---|---|---|---|---|---|
| 0 | 0 | 1 | 0 | 0 | 0 |
| 0 | 1 | 0 | 1 | 0 | 0 |
| 1 | 0 | 0 | 0 | 1 | 0 |
| 1 | 1 | 0 | 0 | 0 | 1 |

FIG. 29

| $C_1$ | $C_2$ | $C_3$ | $M_1$ | $M_2$ | $M_3$ | $M_4$ | $M_5$ | $M_6$ | $M_7$ |
|---|---|---|---|---|---|---|---|---|---|
| 0 | 0 | 0 | 0 | 0 | 0 | 0 | 0 | 0 | 0 |
| 0 | 0 | 1 | 1 | 0 | 0 | 0 | 0 | 0 | 0 |
| 0 | 1 | 0 | 1 | 1 | 0 | 0 | 0 | 0 | 0 |
| 0 | 1 | 1 | 1 | 1 | 1 | 0 | 0 | 0 | 0 |
| 1 | 0 | 0 | 1 | 1 | 1 | 1 | 0 | 0 | 0 |
| 1 | 0 | 1 | 1 | 1 | 1 | 1 | 1 | 0 | 0 |
| 1 | 1 | 0 | 1 | 1 | 1 | 1 | 1 | 1 | 0 |
| 1 | 1 | 1 | 1 | 1 | 1 | 1 | 1 | 1 | 1 |

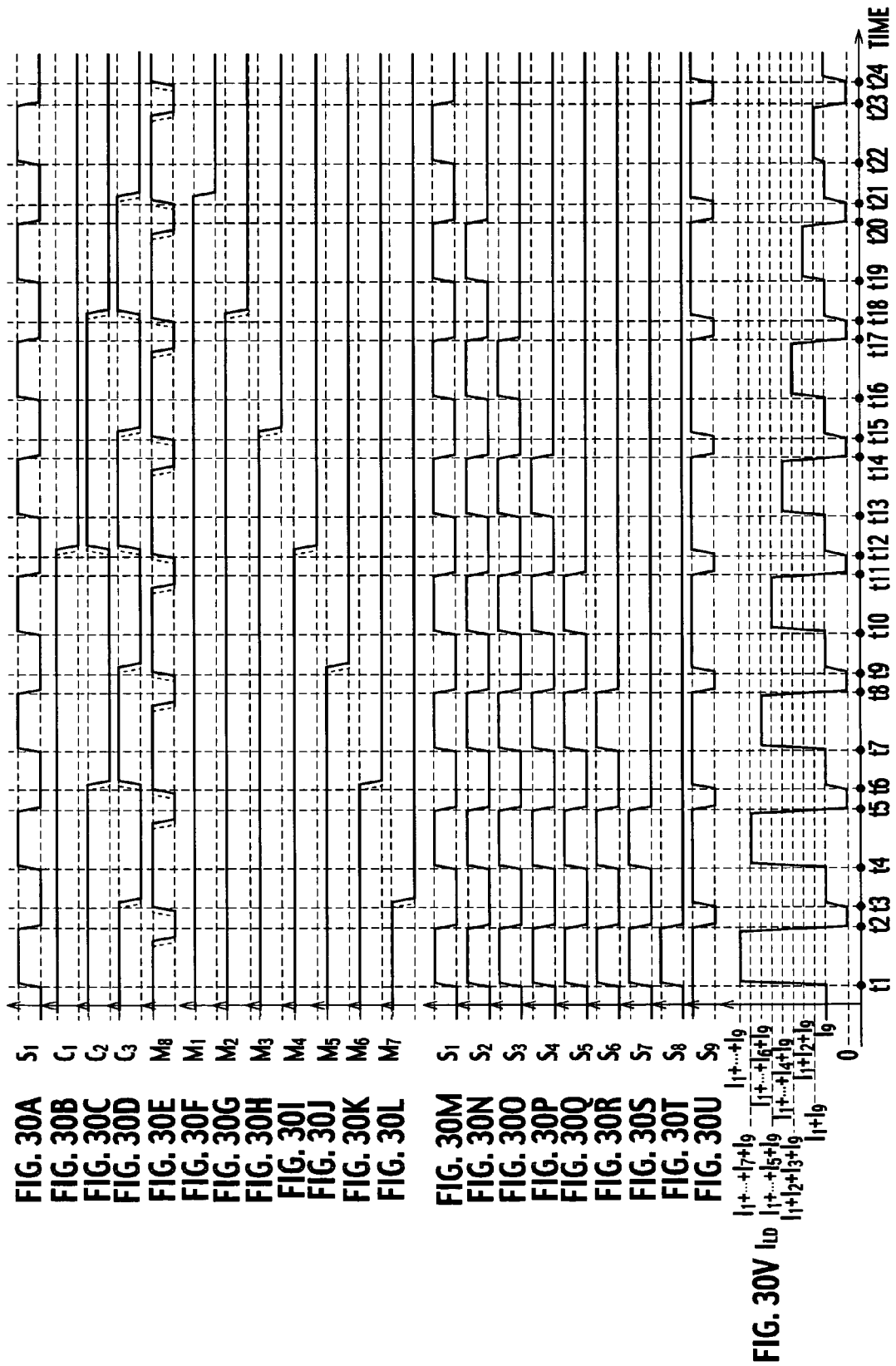

LASER CONTROLLER FOR A MULTI-INTENSITY RECORDING LASER AND AN OPTICAL DISK DRIVE INCLUDING THE SAME

CROSS REFERENCE TO RELATED APPLICATIONS

This application is based upon and claims the benefit of priority from the prior Japanese Patent Applications No. P2003-187039 filed on Jun. 30, 2003, and No. P2004-017263 filed on Jan. 26, 2004; the entire contents of which are incorporated herein by reference.

BACKGROUND OF THE INVENTION

1. Field of the Invention

The present invention relates to an optical disk drive and, more particularly, to a laser controller for controlling a laser equipped in a pickup of the optical disk drive.

2. Description of the Related Art

A pickup for reading light reflected from a laser irradiated on an optical disk contains a laser driver for driving a laser. Recent technology advances to develop multi-intensity recording lasers, as well as a more high precision architecture for adjusting the pulse width of recording lasers. In order to bring about changes to multi-intensity recording lasers, as well as changes to a more high precision adjustment of the pulse width of recording lasers, the laser driver controls the irradiation timing as well as the output level of the recording laser. A "timing signal" is a signal that controls the timing for changing output levels of the laser. An electric current-setting signal is used to control the output level of the laser. The timing signal is normally transmitted to the laser driver as parallel data.

Optical disks devices are roughly classified with pickups, and the print circuit boards equipped with circuits such as controllers. A technique of mounting a timing controller generating the timing signal and a laser driver inside of the pickup has been proposed (hereinafter referred to as a "first background art"). A technique of mounting a laser driver inside of the pickup, and establishing a timing controller on the circuit board has also been proposed (hereinafter referred to as a "second background art"). Because the pickup is able to repeatedly shift back and forth within the inner and the outer confines, the pickup is connected to the print circuit board by means of a cable possessing flexibility, that is, a flexible-cable.

Concerning the first background art, by mounting the timing controller inside of the pickup, heat given off by the timing controller leads to an increase in the heat level inside of the pickup. It is difficult to mount a heat-diffusing structure in the limited space inside of the movable pickup. As a result, the properties of the laser device deteriorate due to the heat given off by the timing controller. Furthermore, the power requirements of the timing controller increase the overall power consumption level of the pickup. Things such as preset data used for subtle adjustments in the irradiation timing of the laser, as well as recording data modulated by a modulator become essential to the timing controller as input signals. Since things like the preset data and the recording data are transmitted to the timing controller via the flexible cable, the number of signal lines that the flexible cable possesses must increase. The more signal lines that the flexible cable possesses the heavier it becomes, which negatively affects the performance of the pickup.

Concerning the second background art, a delay occurs each time a timing signal passes through the flexible cable. When waveform distortion occurs in the laser's electric current by the delay difference of the timing signals transmitted as the parallel data, a fall in the precision of the irradiation timing of the laser results. The integrity of the data recorded on the optical disk will fall proportionately to the amount of drop in the precision of the irradiation timing of the laser. This becomes a large problem for optical disk devices that record at high speed. Consequently, additional circuitry such as resistors becomes needed as a countermeasure against signal delays. In recent years, due to increases in recording speed and increases in the density of recording media, timing control for switching the laser drive current has come to require resolution at a precision of several hundred [ps]. Therefore, there arises the need to increase the frequency of a resistor-employing exterior clock, which limits efforts at attaining high precision. Because of this limit on attaining high precision, it is impossible to sufficiently raise recording integrity in instances where a signal delay occurs.

SUMMARY OF THE INVENTION

An aspect of the present invention inheres in a laser controller encompassing, a timing signal generator configured to generate a timing signal for controlling the irradiation timing of the laser in accordance with input data, and a mask signal generator configured to generate a mask timing signal for masking the timing signal in accordance with the input data.

Another aspect of the present invention inheres in a laser controller encompassing, an electric current generator configured to generate a plurality of drive electric currents for controlling an output level of the laser, and an electric current controller configured to execute arithmetic processing of a timing signal for controlling the irradiation timing of the laser and a mask timing signal for masking the timing signal, and to generate a laser drive electric current from the drive electric currents based on the results of the arithmetic processing.

Still another aspect of the present invention inheres in a laser controller encompassing, a laser unit configured to irradiate the laser on an optical disk, a driver controller configured to generate a timing signal for controlling the irradiation timing of the laser and a mask timing signal for masking the timing signal, and a laser driver configured to execute arithmetic processing of the timing signal and the mask timing signal, and to control the laser unit based on the results of the arithmetic processing.

Still another aspect of the present invention inheres in a laser controller encompassing, a modulator configured to modulate record data from a system controller, a laser controller configured to generate a timing signal for controlling the irradiation timing of the laser and a mask timing signal for masking the timing signal based on the modulated record data, and to execute arithmetic processing of the timing signal and the mask timing signal, and to control the laser based on the results of the arithmetic processing, a disk motor configured to drive the optical disk, and a disk motor controller configured to control the disk motor.

BRIEF DESCRIPTION OF THE DRAWINGS

FIG. 2 is a block diagram showing a laser controller according to first embodiment of the present invention;

FIG. 3 is a block diagram showing a timing controller according to the first embodiment of the present invention;

FIGS. 4A to 4E are time charts showing the operation of the laser controller according to the first embodiment of the present invention;

FIGS. 5A to 5D are time charts showing the operation of the laser controller according to the first embodiment of the present invention;

FIG. 20 is a table showing functions of an encoder and a decoder according to the fifth embodiment of the present invention;

FIG. 23 is a table showing functions of an encoder and a decoder according to the first modification of the fifth embodiment;

FIG. 26 is a table showing functions of an encoder and a decoder according to the second modification of the fifth embodiment;

FIG. 29 is a table showing functions of an encoder and a decoder according to the sixth embodiment of the present invention; and FIGS. 30A to 30V are time charts showing the operation of the laser controller according to the sixth embodiment of the present invention.

DETAILED DESCRIPTION OF THE INVENTION

Figure 1:
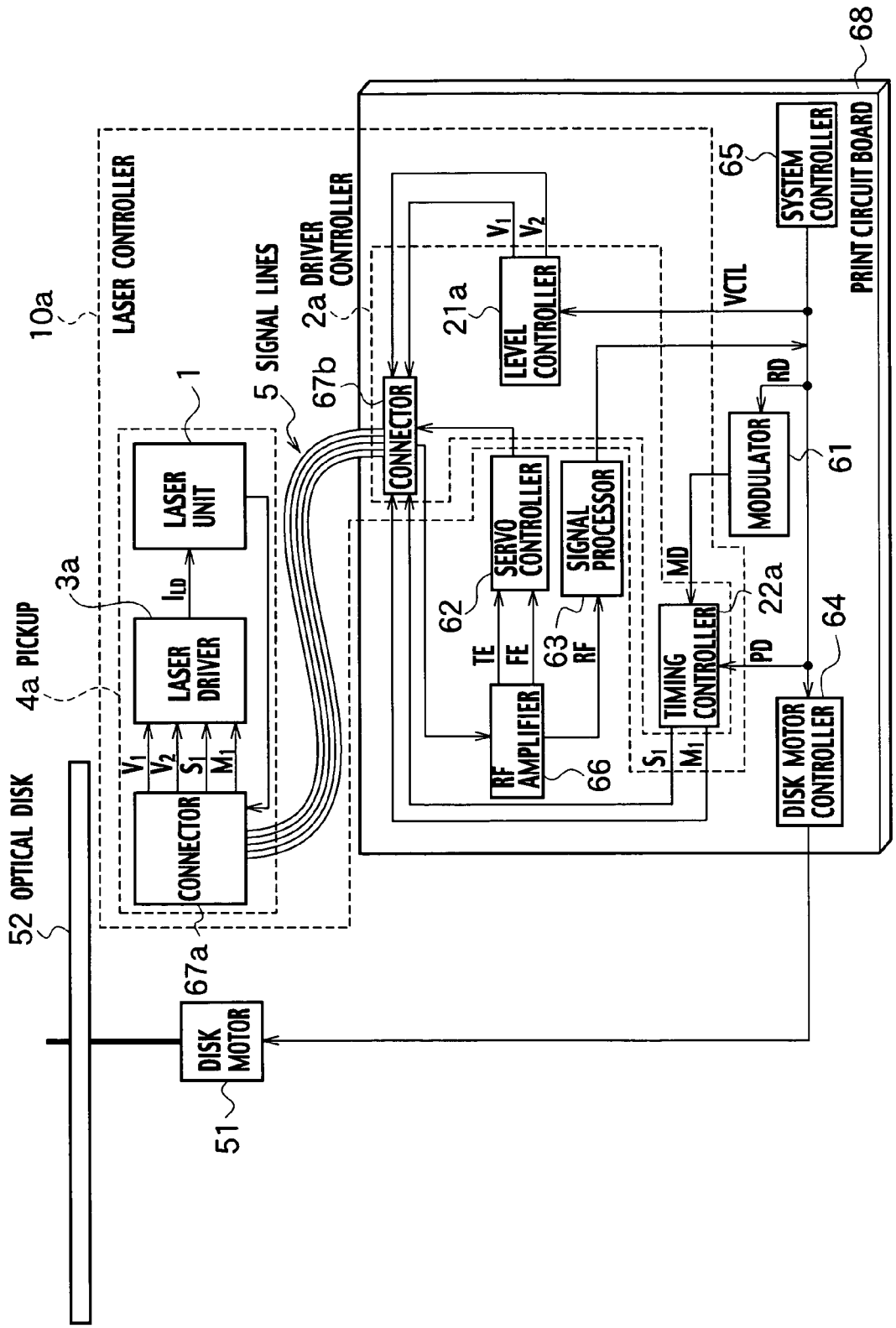
FIG. 1 is a schematic diagram showing an optical disk drive according to a first embodiment of the present invention.

Various embodiments of the present invention will be described with reference to the accompanying drawings. It is to be noted that the same or similar reference numerals are applied to the same or similar parts and elements throughout the drawings, and description of the same or similar parts and elements will be omitted or simplified. In the following descriptions, numerous specific details are set forth such as specific signal values, etc. to provide a thorough understanding of the present invention. However, it will be obvious to those skilled in the art that the present invention may be practiced without such specific details. In other instances, well-known circuits have been shown in block diagram form in order not to obscure the present invention with unnecessary detail. In the following description, the words "connect" or "connected" defines a state in which first and second elements are electrically connected to each other without regard to whether or not there is a physical connection between the elements.

First Embodiment

As shown in FIG. 1, the optical disk drive according to a first embodiment of the present invention includes an optical disk 52, a system controller 65, a disk motor 51 configured to drive the optical disk 52, a disk motor controller 64 connected between the system controller 65 and the disk motor 51, a laser controller 10a connected to the system controller 65, a radio frequency (RF) amplifier 66 connected to the laser controller 10a, a servo controller 62 connected between the RF amplifier 66 and the laser controller 10a, and a signal processor 63 connected between the RF amplifier 66 and the system controller 65. The modulator 61 modulates record data RD from the system controller 65. The laser controller 10a generates a timing signal $S_1$ for controlling the irradiation timing of laser irradiating the optical disk 52 and a mask timing signal $M_1$ for masking the timing signal $S_1$ based on the modulated record data (input data) MD. The laser controller 10a also provides arithmetic processing of the timing signal $S_1$ and the mask timing signal $M_1$. The laser controller 10a then controls the laser based on the results of arithmetic processing. The disk motor 51 drives the optical disk. The disk motor controller 64 controls the disk motor 51.

The laser controller 10a includes a pickup 4a, a plurality of signal lines 5 connected to the pickup 4a, and a driver controller 2a connected to the signal lines 5. A flexible cable for instance, can be used as the signal lines 5. The pickup 4a reads light reflected from the optical disk 52, that is, the reflected light generated by irradiating the laser light on the optical disk 52. The signal lines 5 transmit the timing signal $S_1$ and the mask timing signal $M_1$ generated by the driver controller 2a to the pickup 4a. Moreover, the signal lines 5 transmit a first electric current setting signal $V_1$ and a second electric current setting signal $V_2$ generated by the driver controller 2a to the pickup 4a. The RF amplifier 66 generates a tracking error signal TE, a focusing error signal FE, and an information signal RF based on the reading data by the optical disk 52 by the pickup. The servo controller 62 controls the operation of the pickup 4a based on the tracking error signal TE and the focus error signal FE. The signal processor 63 provides signal processing to the information signal RF. A pickup drive mechanism that moves parallel to a recording surface of the optical disk 52 is not illustrated in FIG. 1.

The driver controller 2a includes a connector 67b connected to the signal lines 5, a level controller 21a connected to the connector 67b, and a timing controller 22a connected to the connector 67b. The level controller 21a generates the first electric current setting signal $V_1$ and the second electric current setting signal $V_2$ based on a control signal VCTL from the system controller 65. The first electric current setting signal $V_1$ and the second electric current setting signal $V_2$ may be analog or digital signals. When the first electric current setting signal $V_1$ and the second electric current setting signal $V_2$ are digital signals, a plurality of digital/analog (D/A) converters are prepared in the pickup 4a. In this case, it is possible to transmit the first electric current setting signal $V_1$ and the second electric current setting signal $V_2$ to the pickup 4a via a serial interface. Or, when the first electric current setting signal $V_1$ and the second electric current setting signal $V_2$ are supplied from the system controller 65 as digital signals, a D/A converter can be used instead of the level controller 21a.

The timing controller 22a includes a timing signal generator 221 configured to generate the timing signal $S_1$, and a mask signal generator 222 configured to generate the mask timing signal $M_1$ as shown in FIG. 2. Furthermore, preset data PD for providing a fine adjustment to the timing signal $S_1$ and the mask timing signal $M_1$ is supplied to the timing controller 22a for the purpose of controlling the heat of the optical disk 52 when recording. The pickup 4a includes a connector 67a connected to the signal lines 5, a laser driver 3a connected to the connector 67a, and a laser unit 1 connected to the laser driver 3a. The laser driver 3a executes arithmetic processing of the timing signal and the mask timing signal, and controls the laser unit 1 based on the results of arithmetic processing.

As shown in FIG. 2, the laser driver 3a includes an electric current generator 32a connected to a first signal setting terminal 8a and a second signal setting terminal 8b, and an electric current controller 31a having an input side connected to a timing signal terminal 9a, a first mask signal terminal 9b, the electric current generator 32a, and an output side connected to an electric current outputting terminal 7. The connecters 67a, 67b shown in FIG. 1 are not illustrated in FIG. 2. The electric current generator 32a generates a first drive electric current $I_1$ and a second drive electric current $I_2$. The electric current controller 31a performs arithmetic processing, and controls whether or not the first drive electric current $I_1$ and the second drive electric current $I_2$ is transmitted to the laser unit 1. The laser unit 1 includes a laser diode 11 having an anode connected to the laser driver 3a, and a cathode connected to a ground VSS.

The electric current generator 32a includes a voltage/electric current (V/I) converter 36a connected to the first signal setting terminal 8a, and a second V/I converter 37a connected to the second signal setting terminal 8b. The first V/I converter 36a and the second V/I converter 37a generate the first drive electric current $I_1$ and the second drive electric current $I_2$, respectively.

The electric current controller 31a includes a first AND circuit 35a, a first switch 33a, and a second switch 34a. The first AND circuit 35a has an input side connected to the timing signal terminal 9a and the first mask signal terminal 9b. The first switch 33a has an input side connected to the timing signal terminal 9a and the first V/I converter 36a, and an output side connected to the electric current outputting terminal 7. The second switch 34a has an input side connected to the first AND circuit 35a and the second V/I converter 37a, and an output side connected to the electric current outputting terminal 7. The first AND circuit 35a executes an AND operation to the timing signal $S_1$ and the mask timing signal $M_1$ as arithmetic processing. The first switch 33a performs switching to supply the first drive electric current $I_1$ to the laser unit 1 in accordance with the timing signal $S_1$. The second switch 34a performs switching to supply the second drive electric current $I_2$ to the laser unit 1 in accordance with an output signal of the first AND circuit 35.

For example, a function of the timing controller 22a shown in FIG. 2 is achieved by the circuit arrangement shown in FIG. 3. In FIG. 3, the timing controller 22a includes a lookup table 240, a decoder 230, a timer 250, and an offset time setting circuit 260. The lookup table 240 is connected to a preset terminal 127b. The decoder 230 has an input side connected to a modulation data terminal 127a and the lookup table 240. The decoder 230 also has an output side connected to a timing signal outputting terminal 127c and a mask timing signal outputting terminal 127d. The timer 250 is connected to the decoder 230. The offset time setting circuit 260 is connected to the decoder 230.

The lookup table 240 provides fine adjustment to leading timing and trailing timing of the timing signal $S_1$ and the mask timing signal $M_1$. The offset time setting circuit 260 generates an offset control signal OT for controlling high level periods of the mask timing signal $M_1$. That is, the offset time setting circuit 260 sets leading edges of the mask timing signal $M_1$ before leading edges of the timing signal $S_1$. The offset time setting circuit 260 sets trailing edges of the mask timing signal $M_1$ behind the trailing edges of the timing signal $S_1$. The timer 250 generates the time information TS. The decoder 230 generates the timing signal $S_1$ and the mask timing signal $M_1$ based on the input data MD, the time information TS, a timing control signal TCTL generated by the lookup table 240, and the offset control signal OT.

Next, the operation of the laser controller 10a according to the first embodiment of the present invention will be described referring to FIGS. 1 to 4E.

(A) The level controller 21a shown in FIG. 1 generates the first electric current setting signal $V_1$ and the second electric current setting signal $V_2$ having a fixed voltage value based on the control signal VCTL. The first electric current setting signal $V_1$ and the second electric current setting signal $V_2$ are supplied to the first signal setting terminal 8a and the second signal setting terminal 8b shown in FIG. 2 via the signal lines 5, respectively. The first V/I converter 36a and the second V/I converter 37a provide V/I conversion to the first electric current setting signal $V_1$ and the second electric current setting signal $V_2$ transmitted via the first signal setting terminal 8a and the second signal setting terminal 8b. As a result, the first drive electric current $I_1$ and the second drive electric current $I_2$ are generated.

(B) The timing controller 22a generates the timing signal $S_1$ shown in FIG. 4A and the mask timing signal $M_1$ shown in FIG. 4B based on the input data MD and the preset data PD. The timing signal $S_1$ and the mask timing signal $M_1$ are supplied to the timing signal terminal 9a and the first mask signal terminal 9b via the signal lines 5, respectively. Here, it is assumed that phase errors occur in the mask timing signal $M_1$ in periods of times t1 to t2 and time t5 to t6 by signal delay when the mask timing signal $M_1$ passes through signal lines 5.

(C) The first AND circuit 35a executes the AND operation to the timing signal $S_1$ and the mask timing signal $M_1$ transmitted from the timing controller 22a via the timing signal terminal 9a and the first mask signal terminal 9b. As a result, the output signal $S_2$ shown in FIG. 4D of the first AND circuit 35a is generated. The timing signal $S_1$ is transmitted to the first switch 33a. The output signal $S_2$ of the first AND circuit 35a is transmitted to the second switch 34a.

(D) The first switch 33a is turned on in the high level period of the timing signal $S_1$, i.e. periods of time t3 to t4 and time t7 to t8 shown in FIG. 4A. On the other hand, the second switch 34a is turned on in the high level period of the output signal S2 of the first AND circuit 35a, i.e. a period of time t3 to t4 shown in FIG. 4D. As a result, the electric current value of the laser drive electric current $I_{LD}$ becomes equal to the sum of each electric current value of the first drive electric current $I_1$ and second drive electric current $I_2$ in period of time t3 to t4 as shown in FIG. 4E. The electric current value of the laser drive electric current $I_{LD}$ becomes equal to the electric current value of the first drive electric current $I_1$ in period of time t7 to t8. The laser drive electric current $I_{LD}$ is transmitted to the laser diode 11 via the electric current outputting terminal 7.

As described above, with the laser controller 10a according to the first embodiment by masking the timing signal $S_1$ by use of the mask timing signal $M_1$, it is possible to maintain precision of output timing of the laser when phase errors occur in the timing signal $S_1$ and the mask timing signal $M_1$. That is, by adding an offset time to the mask timing signal $M_1$ as shown in FIG. 5B, it is possible to mask the timing signal $S_1$ entirely. Accordingly, waveform distortion is not generated in the laser drive electric current $I_{LD}$ in time t3 and t8 as shown in FIG. 5D when the phase errors are generated in the timing signal $S_1$ shown in FIG. 5A and the mask timing signal $M_1$ shown in FIG. 5B. Furthermore, since the pickup 4a does not include the timing controller 22a, it is possible to prevent the characteristic aggravation of the laser diode 11 caused by the heat quantity increase, as well as the decrease in search performance cased by an increase in weight. As a result, the laser controller 10a and the optical disk drive according to the first embodiment can perform recording with high reliability when the signal delay occurs.

Figure 6:
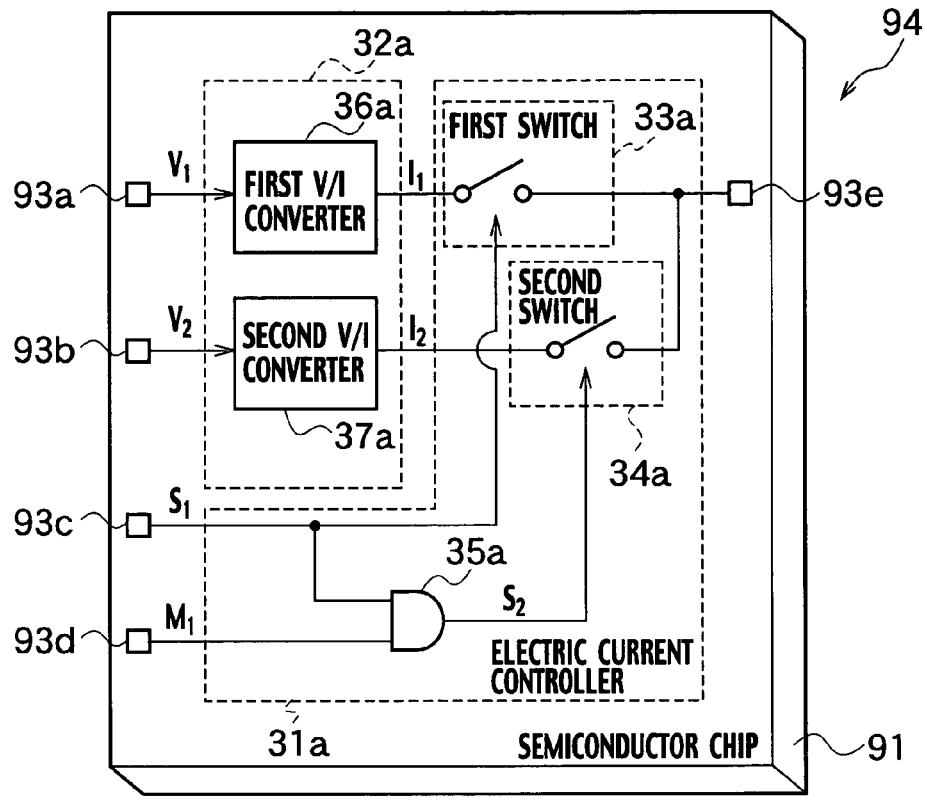
FIG. 6 is a schematic diagram showing a semiconductor integrated circuit according to the first embodiment of the present invention.

The laser driver 3a shown in FIG. 2 can be monolithically integrated onto a single semiconductor chip 91, as shown in FIG. 6, and a semiconductor integrated circuit (semiconductor device) 94 can be formed. In the example shown in FIG. 6, the semiconductor integrated circuit 91 further includes bonding pads 93a to 93e on the semiconductor chip 91. The bonding pad 93a is an internal terminal for transmitting the first electric current setting signal $V_1$ to the first V/I converter 36a. The bonding pad 93b is an internal terminal for transmitting the second electric current setting signal $V_2$ to the second V/I converter 37a. The bonding pad 93c is an internal terminal for transmitting the timing signal $S_1$ to the first switch 33a and the first AND circuit 35a. The bonding pad 93d is an internal terminal for transmitting the mask timing signal $M_1$ to the first AND circuit 35a. The bonding pad 93e is an internal terminal for transmitting the laser drive electric current $I_{LD}$ to the laser diode 11. It is possible to decrease the transmission time difference of the timing signal $S_1$ and the output signal $S_2$ of the first AND circuit 35a, the first switch 33a and the second switch 34a when the laser driver 3a is monolithically integrated on the semiconductor chip 91. Accordingly, it is possible to control the laser with high precision.

Figure 7:
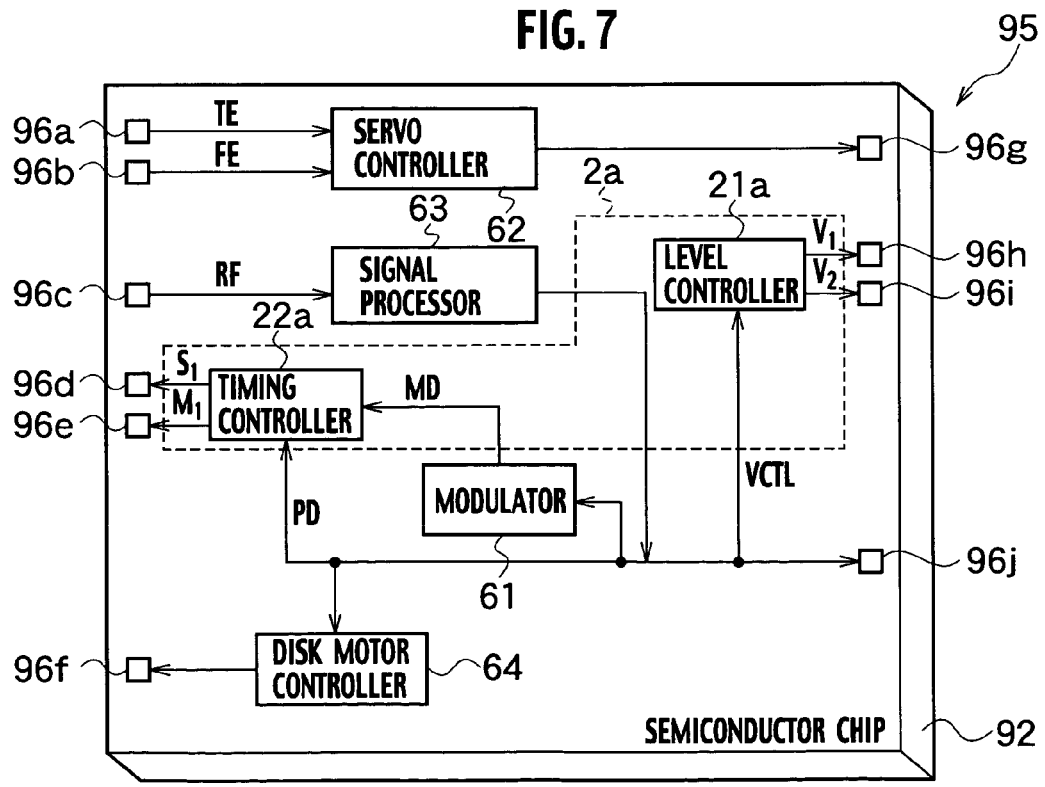
FIG. 7 is a schematic diagram showing a semiconductor integrated circuit according to the first embodiment of the present invention.

The driver controller 2a shown in FIG. 2 can be monolithically integrated onto a single semiconductor chip 92, as shown in FIG. 7, and a semiconductor integrated circuit (semiconductor device) 95 can be formed. In the example shown in FIG. 7, the servo controller 62, the signal processor 63, and the modulator 61 shown in FIG. 7 are integrated on the semiconductor chip 92. However, the level controller 21a may be included in the RF amplifier 66 shown in FIG. 1. Or, the level controller 21a may be independently placed on the print circuit board 68 shown in FIG. 1.

Moreover, the semiconductor integrated circuit 92 includes bonding pads 96a to 96j on the semiconductor chip 92. The bonding pads 96a and 96b are internal terminals for transmitting the tracking error signal TE and the focus error signal FE to the servo controller 62. The bonding pads 96c is an internal terminal for transmitting the information signal RF to the signal processor 63. The bonding pads 96d and 96e are internal terminals for transmitting the timing signal $S_1$ and the mask timing signal $M_1$ to the exterior of the semiconductor chip 92. The bonding pad 96f is an internal terminal for transmitting an output signal of the disk motor controller 64 to the exterior of the semiconductor chip 92. The bonding pad 96g is an internal terminal for transmitting an output signal of the servo controller 62 to the exterior of the semiconductor chip 92. The bonding pads 96h and 96i are internal terminals for transmitting the first electric current setting signal $V_1$ and the second electric current setting signal $V_2$ to an external of the semiconductor chip 92. The bonding pad 96j is an internal terminal for transmitting signals generated by the system controller 65 and each circuit block shown in FIG. 1.

(First Modification of First Embodiment)

Figure 8:
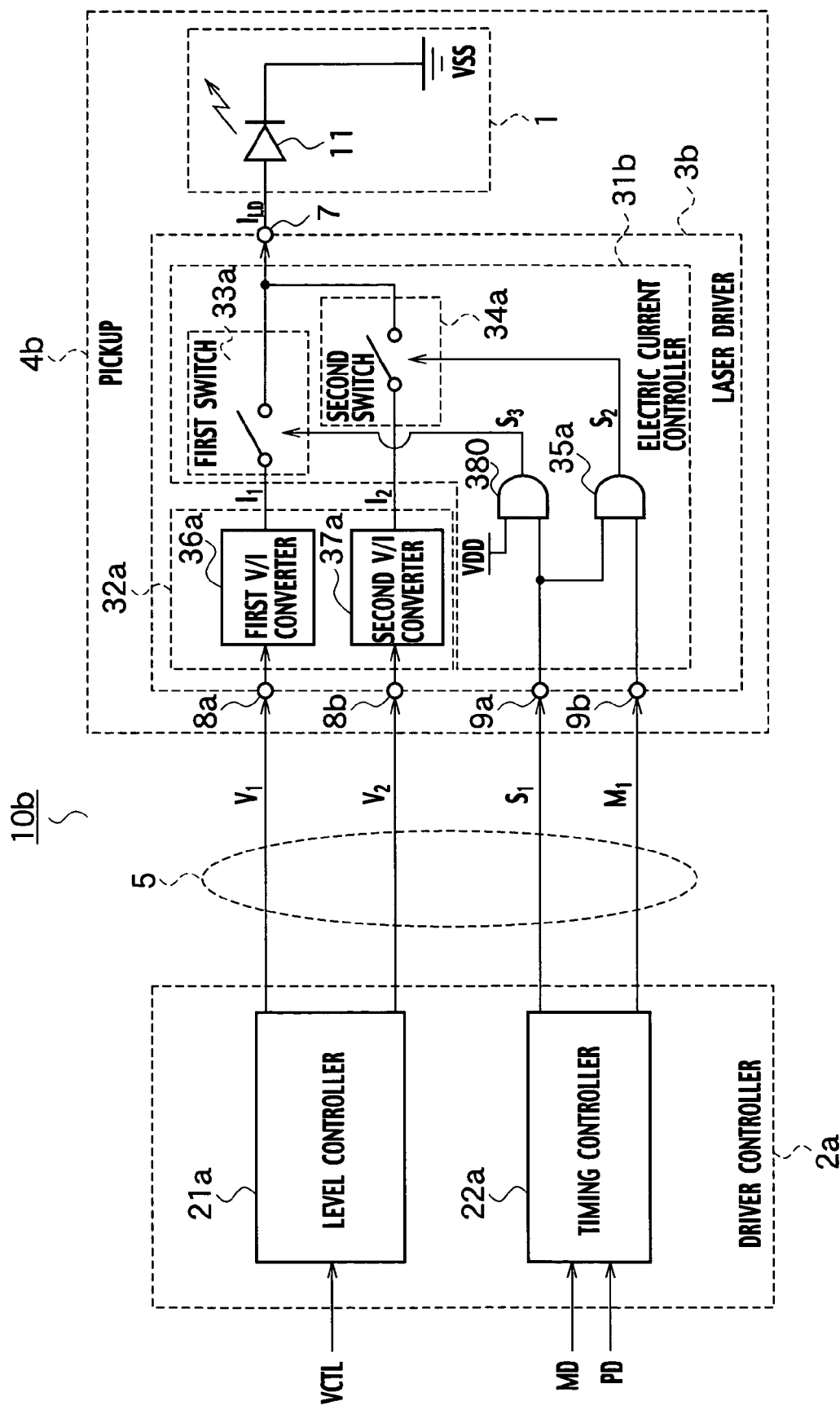
FIG. 8 is a block diagram showing a laser controller according to a first modification of the first embodiment.

As shown in FIG. 8, an electric current controller 31b may include a second AND circuit 380 having an input side connected to the timing signal terminal 9a and the voltage source VDD, and an output side connected to the first switch 33a as a laser controller 10b according to a first modification of the first embodiment. The second AND circuit 380 executes an AND operation to a high level signal from the voltage source VDD and the timing signal $S_1$. The first switch 33a performs switching to supply the first drive electric current $I_1$ to the laser unit 1 in accordance with an output signal $S_3$ of the second AND circuit 380. In the electric current controller 31a shown in FIG. 2, a small phase difference occurs between the timing signal $S_1$ and the output signal $S_2$ of the first AND circuit 35a by a signal delay in generating the output signal $S_2$. On the other hand, in the electric current controller 31b shown in FIG. 8, each signal delay of the first AND circuit 35a and the second AND circuit 380 is equal. Therefore, the laser controller 10b shown in FIG. 8 can control the laser with high precision compared to the laser controller 10a shown in FIG. 2.

(Second Modification of First Embodiment)

Figure 9:
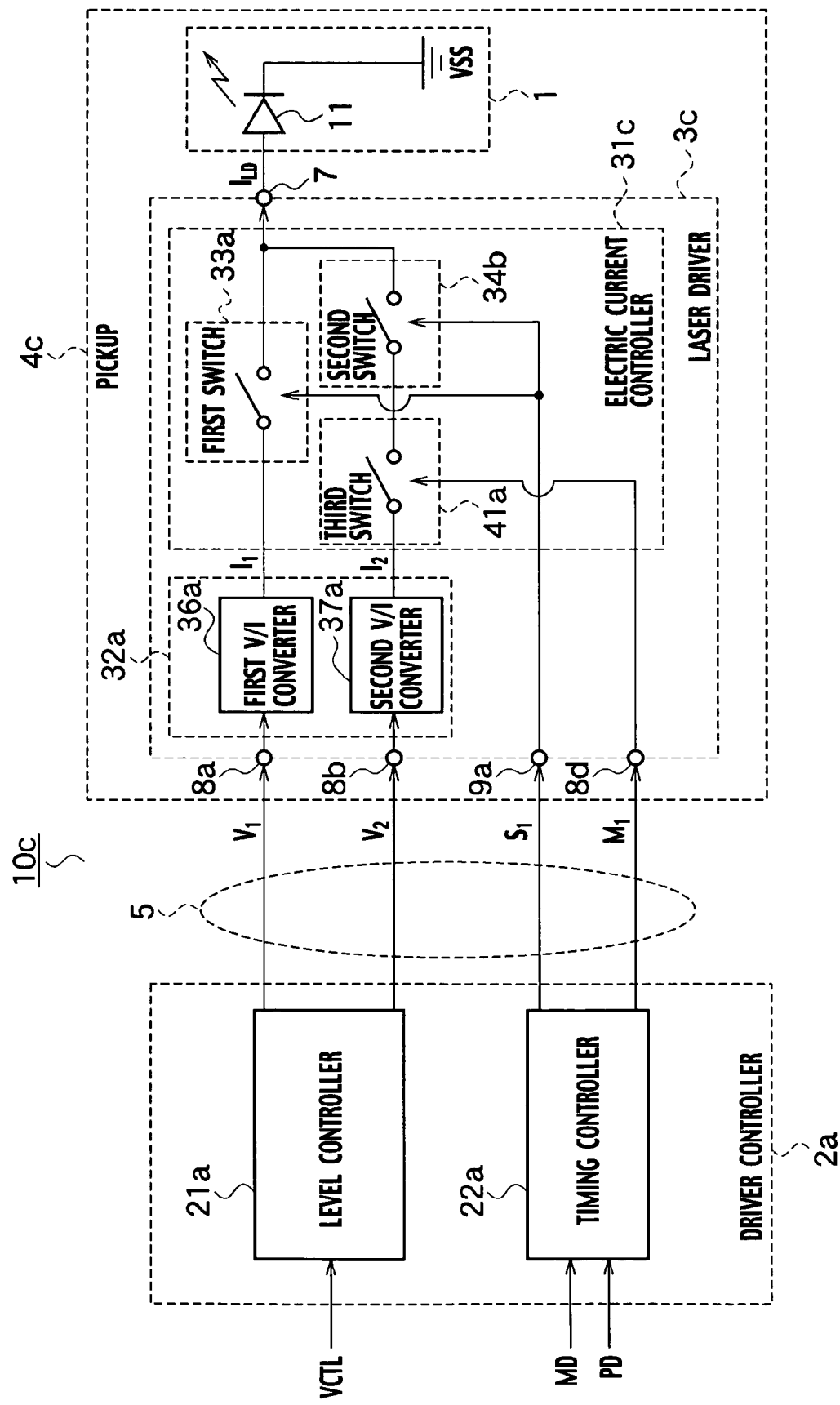
FIG. 9 is a block diagram showing a laser controller according to a second modification of the first embodiment.

As shown in FIG. 9, an electric current controller 31c may include a third switch 41a connected between the second V/I converter 37a and the second switch 34b as a laser controller 10c according to a second modification of the first embodiment. The third switch 41a performs switching to supply the second drive electric current $I_2$ to the second switch 34b in accordance with the mask timing signal $M_1$. The electric current controller 31c does not include the first AND circuit 35a shown in FIG. 2. The second switch 34b performs switching to supply the second drive electric current $I_2$ to the laser unit 1 in accordance with the timing signal $S_1$. The electric current controller 31c shown in FIG. 9 realizes an AND operation of the timing signal $S_1$ and the mask timing signal $M_1$ by serially connecting the third switch 41a and the second switch 34b.

(Third Modification of First Embodiment)

Figure 10:
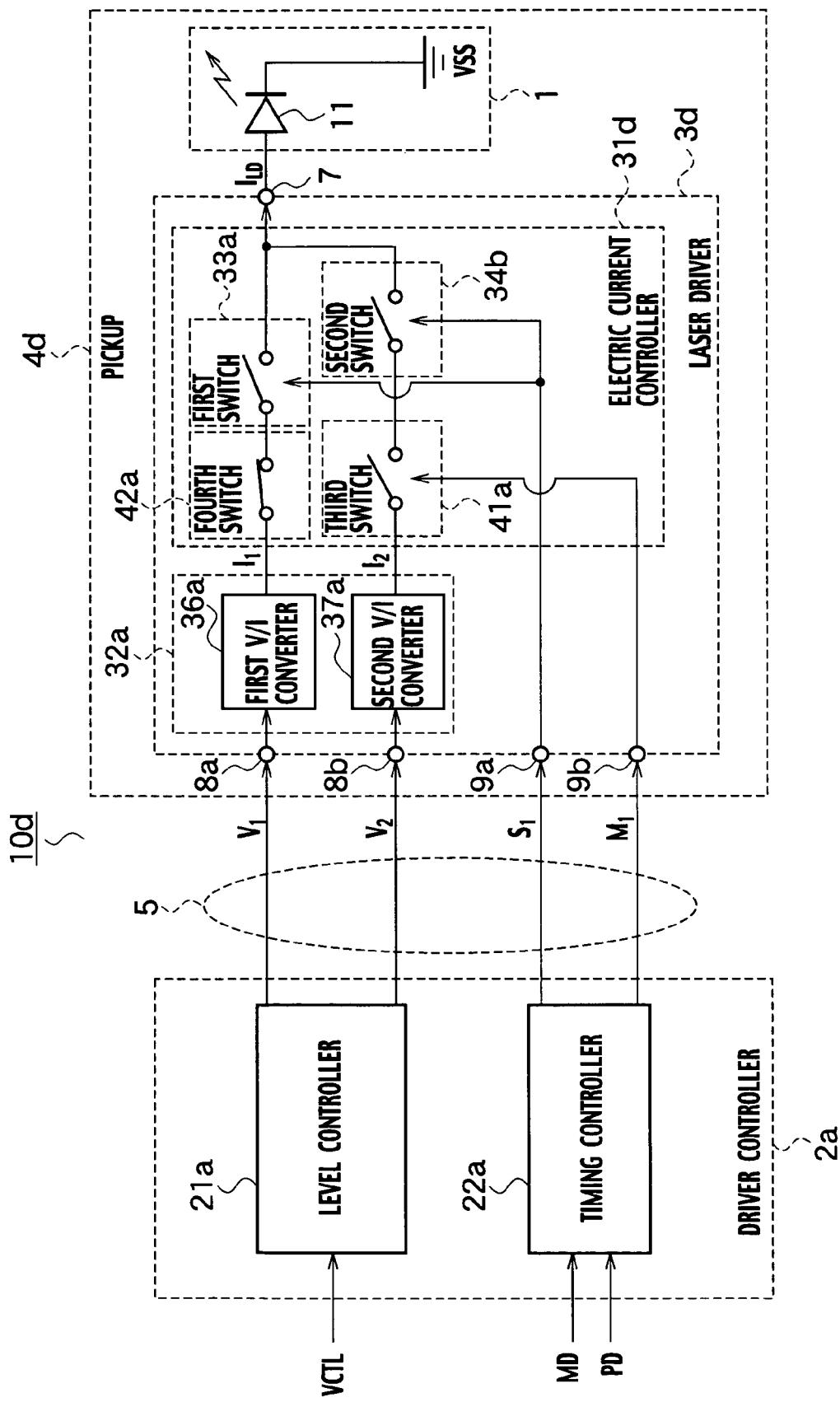
FIG. 10 is a block diagram showing a laser controller according to a third modification of the first embodiment.

As shown in FIG. 10, a laser controller 10d according to a third modification of the first embodiment is different from the electric current controller 31c shown in FIG. 9 in that an electric current controller 31d further includes a fourth switch 42a connected between the electric current generator 32a and the first switch 33a. The fourth switch is in its ON state constantly. As a result, it is possible to offset delays of the second drive electric current $I_2$ in passing the third switch 41a. Accordingly, it is possible to decrease the arrival time difference between the first drive electric current $I_1$ and the second drive electric current $I_2$.

Second Embodiment

Figure 11:
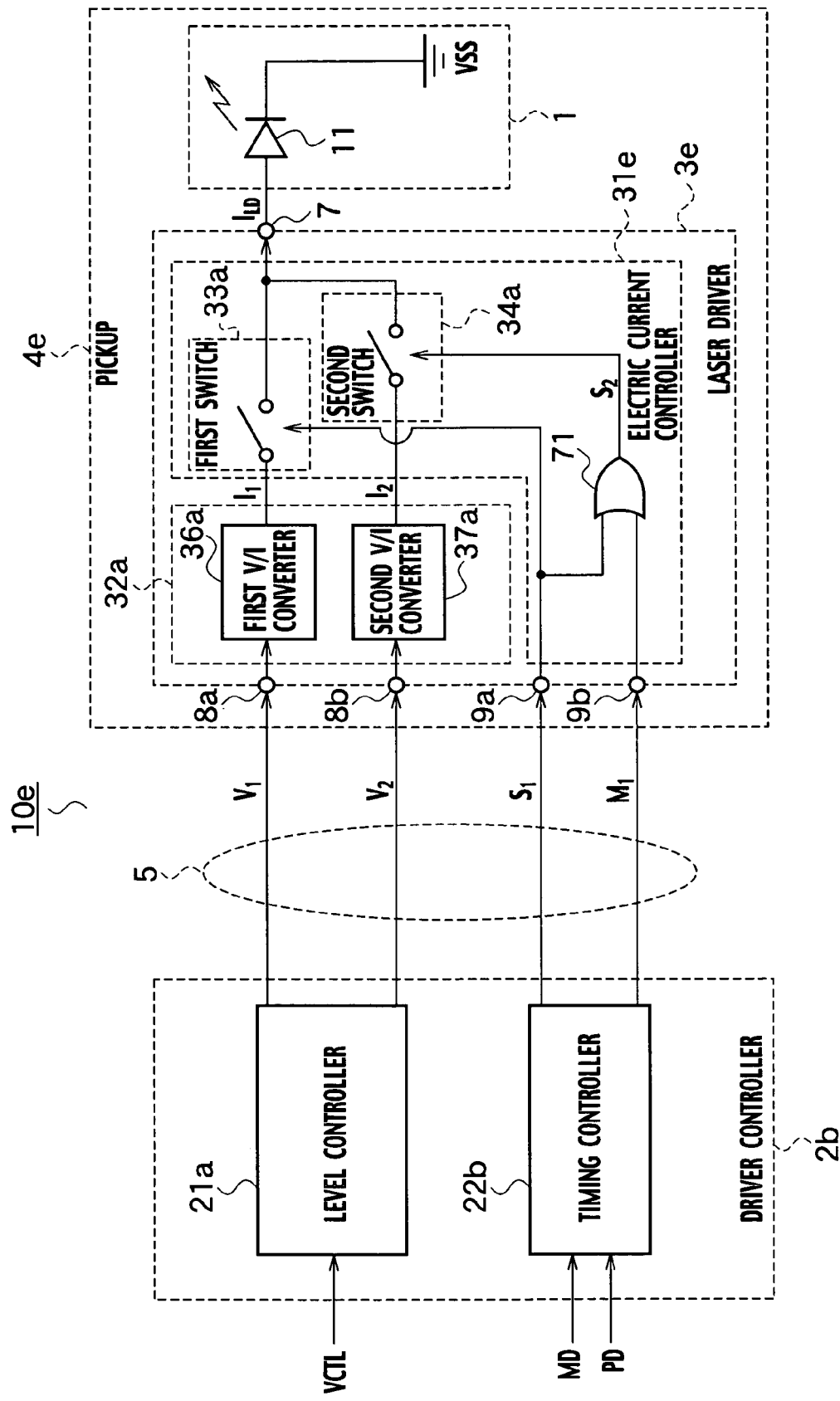
FIG. 11 is a block diagram showing a laser controller according to a second embodiment of the present invention.

As shown in FIG. 11, a laser controller 10e according to a second embodiment of the present invention is different from the laser driver 3a shown in FIG. 2 in that an electric current controller 31e includes an OR circuit 71 having an input side connected to the timing signal terminal 9a and the first mask signal terminal 9b, and an output side connected to the second switch 34a. The OR circuit 71 executes an OR operation to the timing signal $S_1$ and the mask timing signal $M_1$ as arithmetic processing. The timing controller 22b sets the leading edges of the mask timing signal $M_1$ behind the leading edges of the timing signal $S_1$. The offset time setting circuit 260 sets the trailing edges of the mask timing signal $M_1$ before the trailing edges of the timing signal $S_1$.

The laser driver 3e and the driver controller 2b can be monolithically integrated so as to form a semiconductor integrated circuit onto an individual semiconductor chip, the as same as FIG. 6 and FIG. 7. Other configurations are similar to the laser controller 10a shown in FIG. 2.

Figure 12:
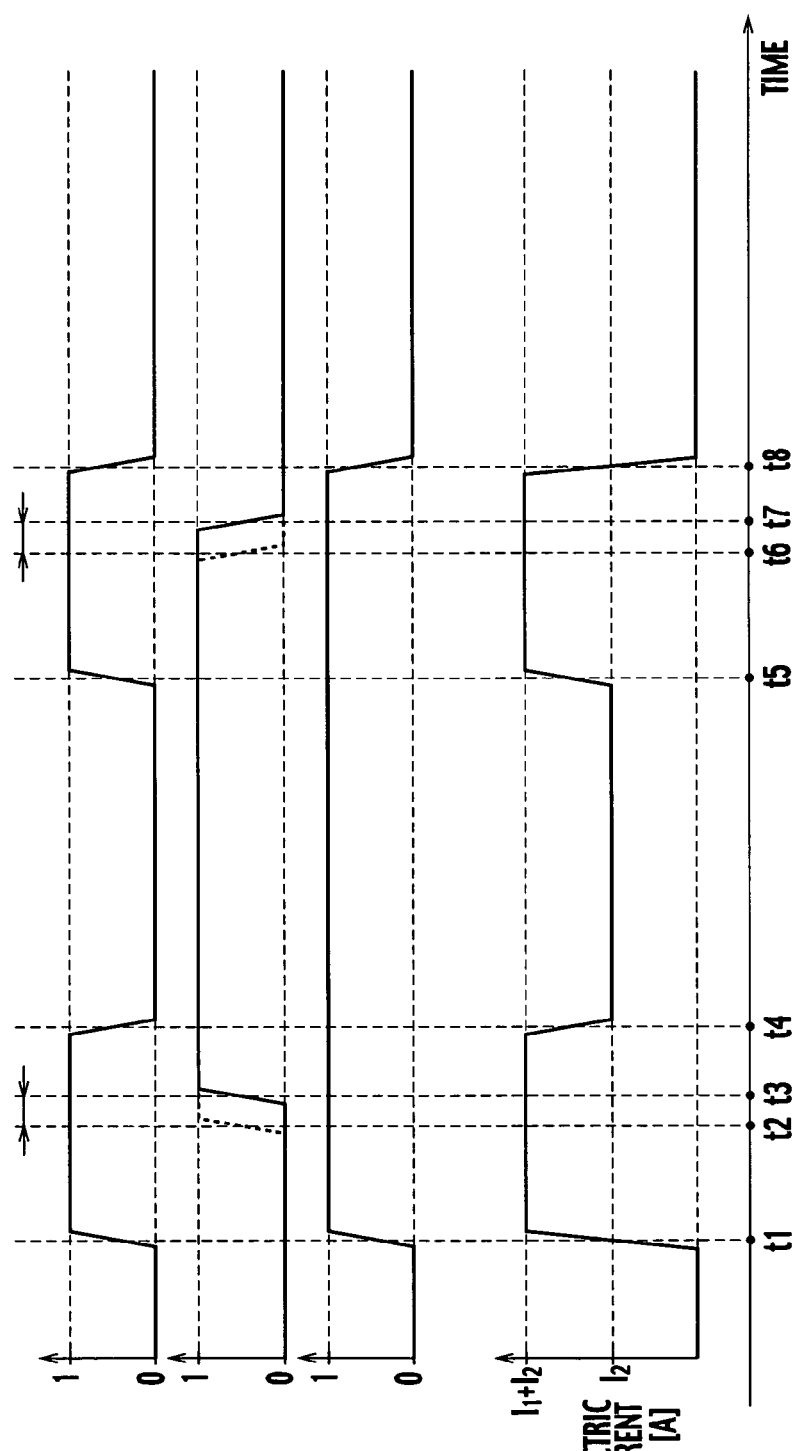
FIGS. 12A to 12D are time charts showing the operation of the laser controller according to the second embodiment of the present invention.

Next, the operation of the laser controller 10e according to the second embodiment will be described by using FIG. 11 to FIG. 12D. Repeated descriptions for the same operations according to the second embodiment which are the same as the first embodiment are omitted.

(A) The level controller 21a shown in FIG. 11 supplies the first electric current setting signal $V_1$ and the second electric current setting signal $V_2$ to the first V/I converter 36a and the second V/I converter 37a. The timing controller 22b generates the timing signal $S_1$ shown in FIG. 12A and the mask timing signal $M_1$ shown in FIG. 12B based on the input data MD and the preset data PD. Here, it is assumed that signal delays occur in the mask timing signal $M_1$ in the periods of times t2 to t3 and time t6 to t7 shown in FIG. 12B when the mask timing signal $M_1$ passes in the signal lines 5.

(B) The OR circuit 71 executes the OR operation to the timing signal $S_1$ and the mask timing signal $M_1$. As a result, the output signal $S_2$ of the OR circuit 71 is generated as shown in FIG. 12C. The timing signal $S_1$ is transmitted to the first switch 33a. The output signal $S_2$ of the OR circuit 71 is transmitted to the second switch 34a.

(C) The first switch 33a is turned on in the high level period of the timing signal $S_1$, i.e. periods of time t1 to t4 and time t5 to t8 shown in FIG. 12A. On the other hand, the second switch 34a is turned on in the high level period of the output signal $S_2$ of OR circuit 71, i.e. a period of time t1 to t8 shown in FIG. 12C. As a result, a electric current value of the laser drive electric current $I_{LD}$ becomes equal to the sum of each electric current value of the first drive electric current $I_1$ and the second drive electric current $I_2$ in the periods of time t1 to t4 and time t5 to t8 as shown in FIG. 12D. The electric current value of the laser drive electric current $I_{LD}$ becomes equal to the electric current value of the second drive electric current $I_2$ in the period of time t4 to t5.

Figure 13:
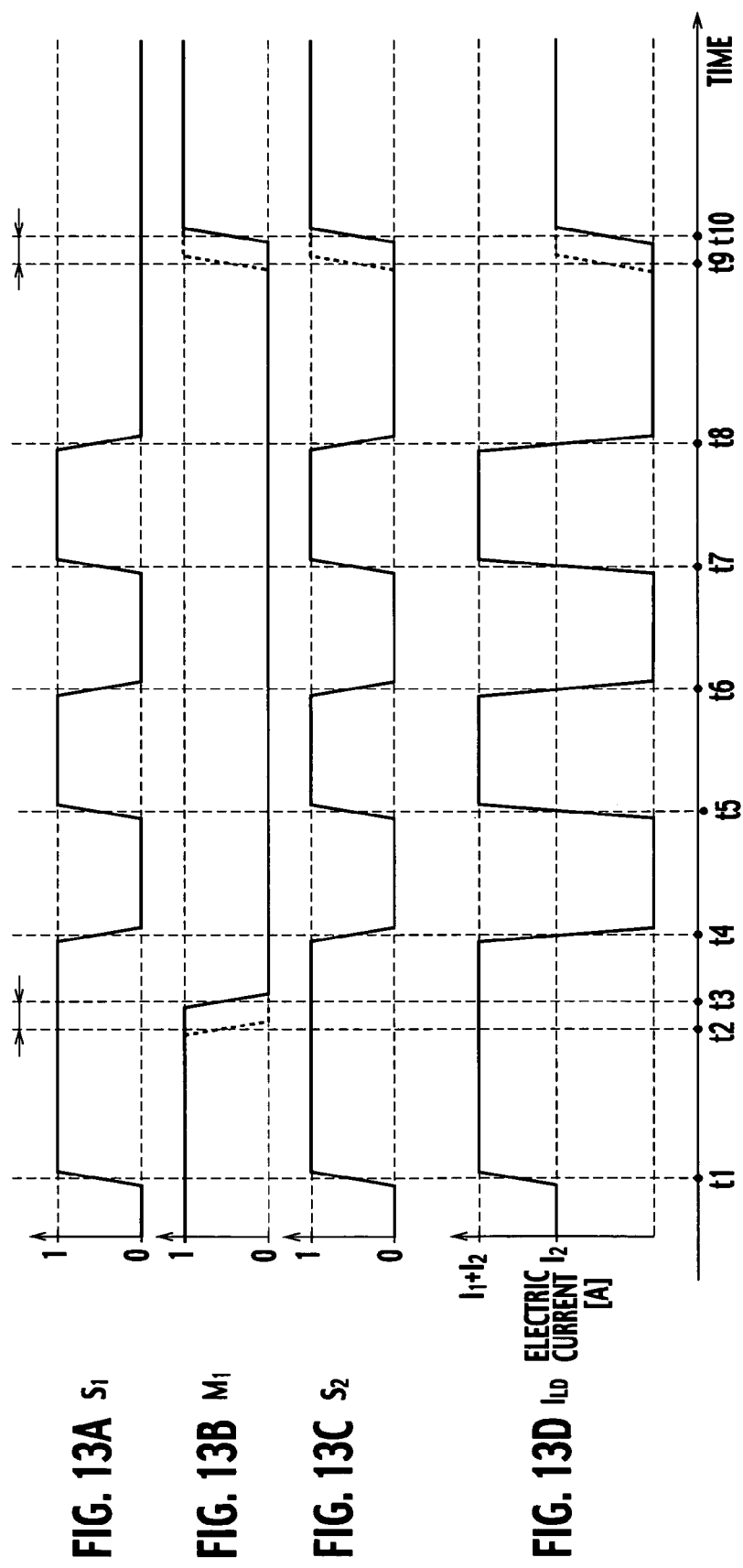
FIGS. 13A to 13D are time charts showing the operation of the laser controller according to the second embodiment of the present invention.

As described above, the laser controller 10e according to the second embodiment, by masking the timing signal $S_1$ by use of the mask timing signal $M_1$, the phase difference between the timing signal $S_1$ and the mask timing signal $M_1$ does not influence the precision of the output timing of the laser. That is, by providing the OR operation to the timing signal $S_1$ shown in FIG. 13A and the mask timing signal $M_1$ shown in FIG. 13B, waveform distortion is not generated in laser drive electric current $I_{LD}$ in time t2 to t3 as shown in FIG. 13D. Therefore, the laser controller 10e and the optical disk drive according to the second embodiment can perform recording with high reliability when the signal delay occurs.

(Modification of Second Embodiment)

Figure 14:
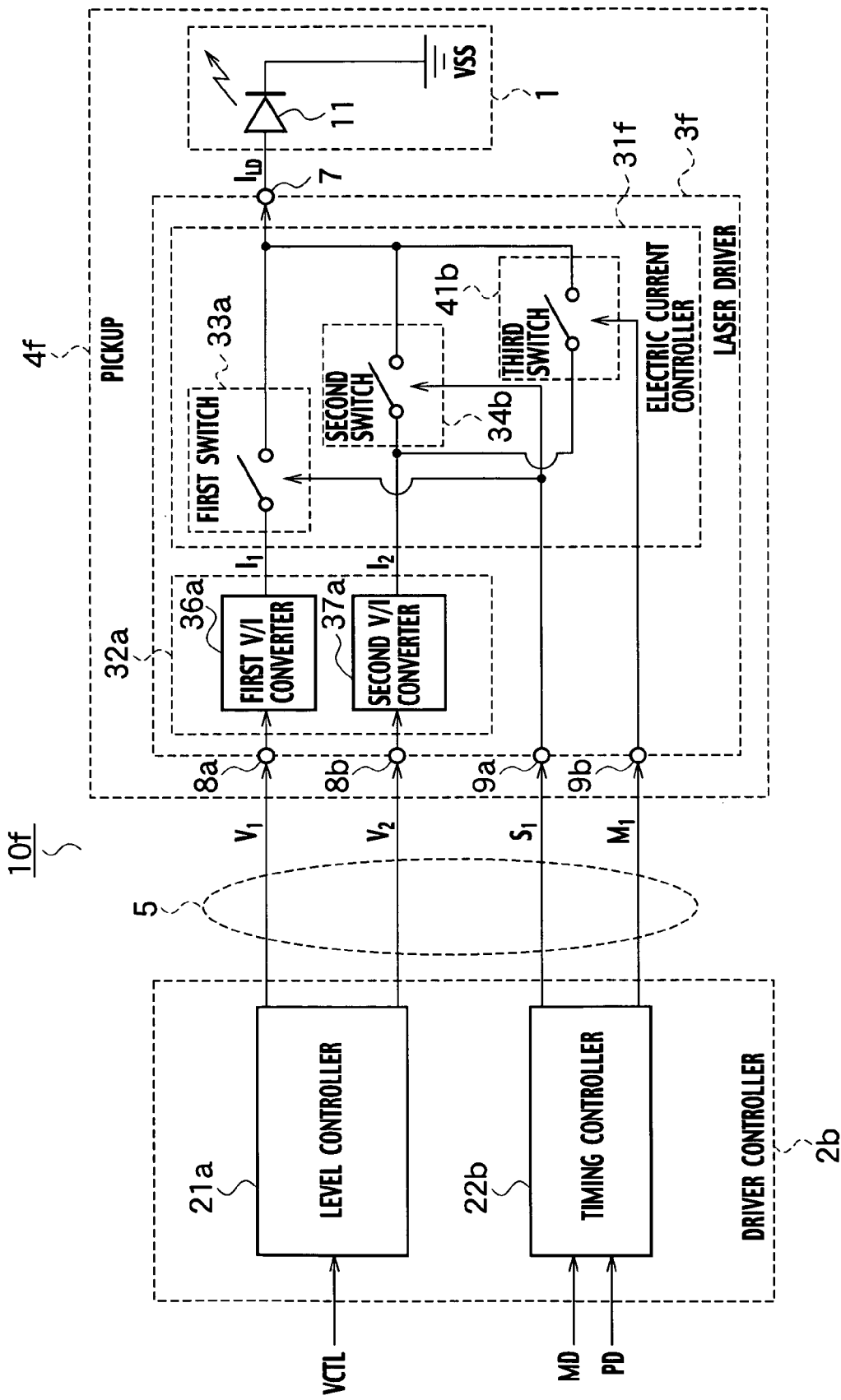
FIG. 14 is a block diagram showing a laser controller according to a modification of the second embodiment.

As shown in FIG. 14, an electric current controller 31f may include a third switch 41b connected in parallel with the second switch 34b as a laser controller 10f according to a modification of the second embodiment. The electric current controller 31f does not include the OR circuit 71 shown in FIG. 11. The third switch 41b performs switching to supply the second drive electric current $I_2$ to the laser unit 1 in accordance with mask timing signal $M_1$. The electric current controller 31f shown in FIG. 16 executes the OR operation of the timing signal $S_1$ and the mask timing signal $M_1$ by switching the second switch 34b based on the timing signal $S_1$ and switching the third switch 41b based on the mask timing signal $M_1$.

Third Embodiment

Figure 15:
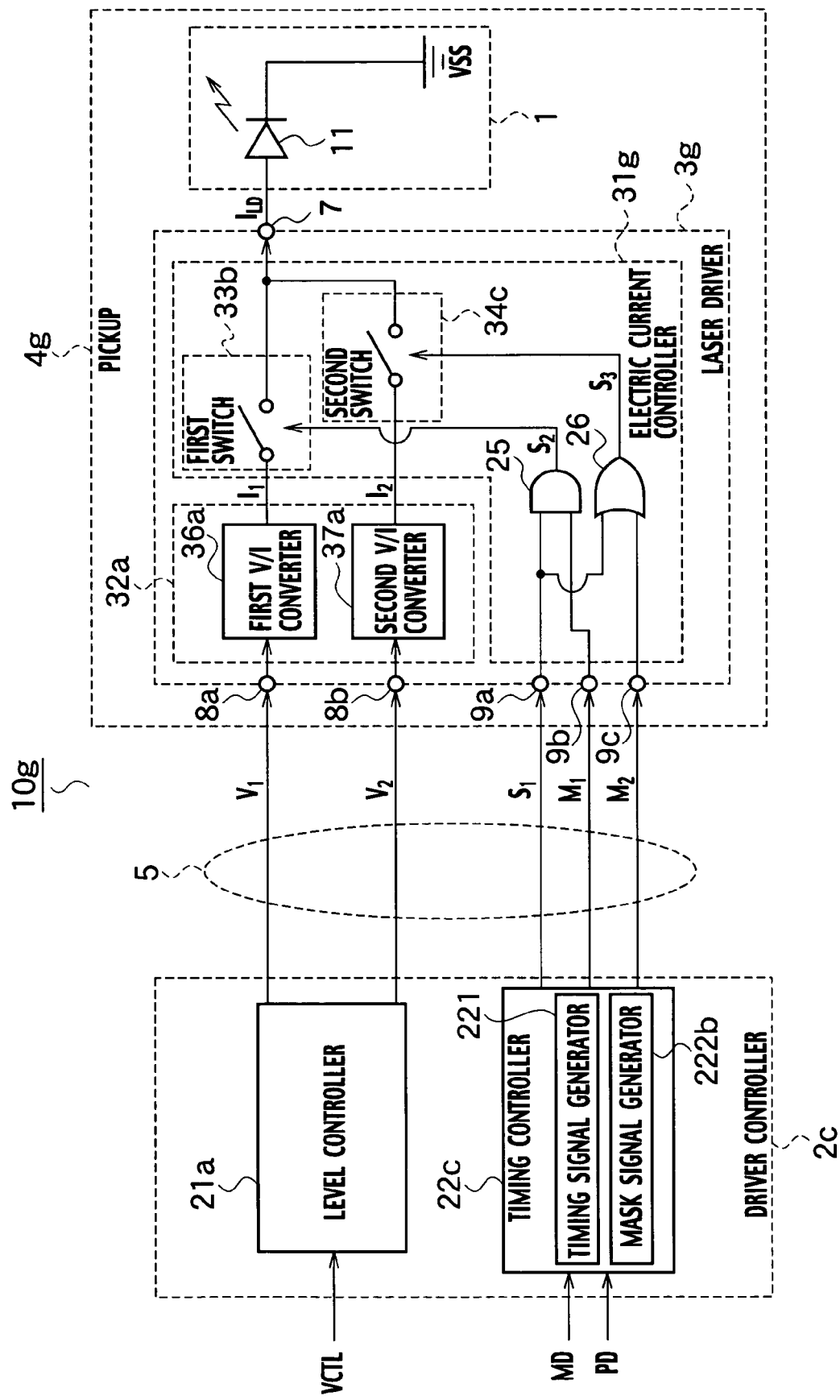
FIG. 15 is a block diagram showing a laser controller according to a third embodiment of the present invention.

As shown in FIG. 15, a laser controller 10g according to a third embodiment of the present invention is different from the timing controller 22a shown in FIG. 2 in that an timing controller 22c generates a plurality of mask timing signals. Specifically, a mask signal generator 222b of the timing controller 22c generates the first and second mask timing signals $M_1$ and $M_2$ for masking the timing signal $S_1$. The electric current controller 31g includes a first AND circuit 25 and an OR circuit 26. The first AND circuit 25 has an input side connected to the timing signal terminal 9a and a first mask signal terminal 9b, and also has an output side connected to the first switch 33b. The OR circuit 26 has an input side connected to the first mask signal terminal 9b and a second mask signal terminal 9c, and also has an output side connected to the second switch 34c.

The first AND circuit 25 executes an AND operation of the timing signal $S_1$ and the first mask timing signal $M_1$. The OR circuit 26 executes an OR operation of the timing signal $S_1$ and the second mask timing signal $M_2$. The first switch 33b performs switching to supply the first drive electric current $I_1$ to the laser unit 1 in accordance with the output signal $S_2$ of the first AND circuit 25. The second switch 34c performs switching to supply the second drive electric current 12 to the laser unit 1 in accordance with the output signal $S_3$ of the OR circuit 26.

The laser driver 3g and the driver controller 2c can be monolithically integrated so as to form a semiconductor integrated circuit onto an individual semiconductor chip, the as same as FIG. 6 and FIG. 7. Other configurations are similar to the laser controller 10a shown in FIG. 2.

Figure 16:
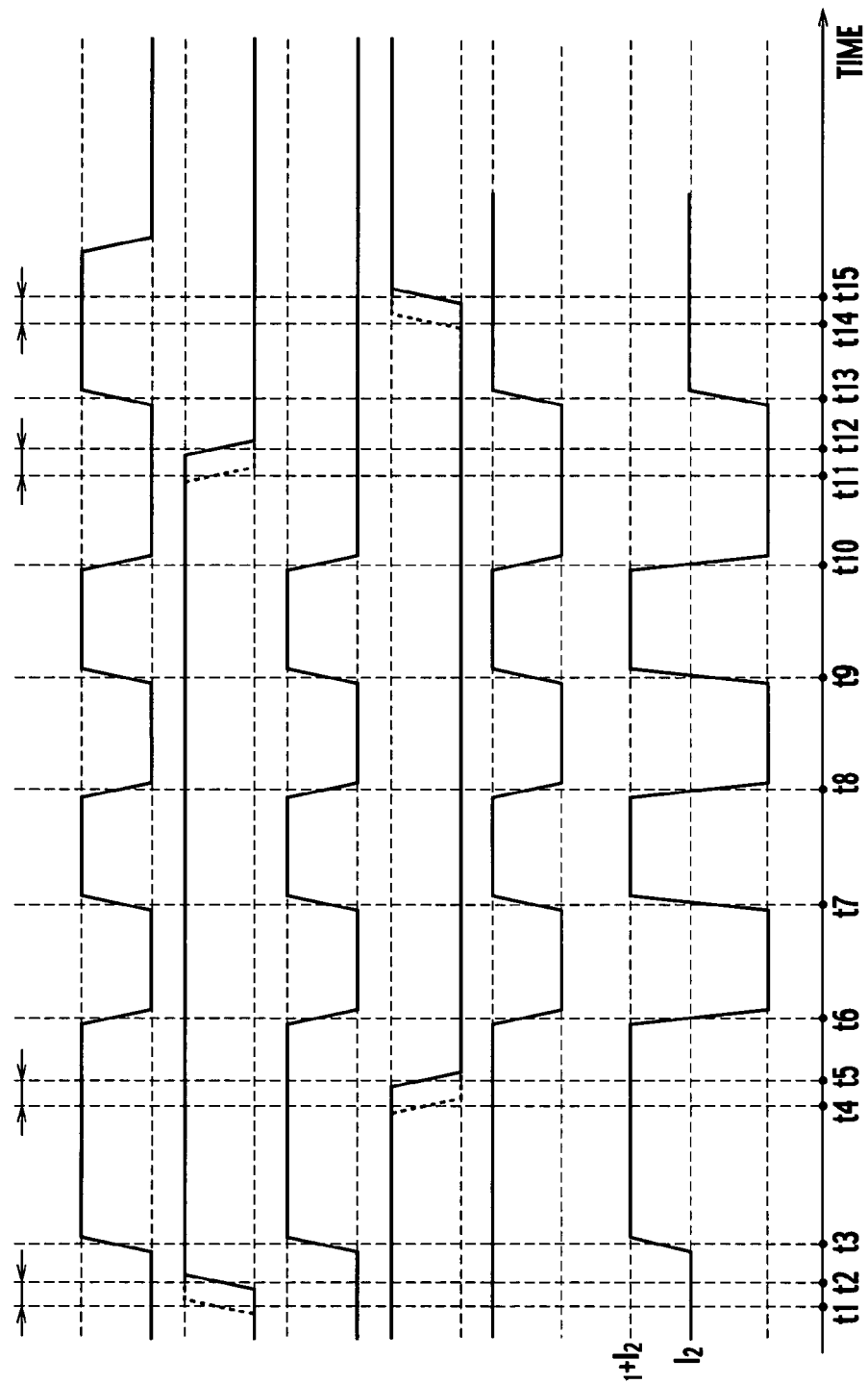
FIGS. 16A to 16F are time charts showing the operation of the laser controller according to the third embodiment of the present invention.

Next, the operation of the laser controller 10g according to the third embodiment will be described by using FIG. 15 to FIG. 16F. Repeated descriptions for the same operations according to the third embodiment which are the same as the first embodiment are omitted.

(A) The level controller 21a shown in FIG. 15 supplies the first electric current setting signal $V_1$ and the second electric current setting signal $V_2$ to the first V/I converter 36a and the second V/I converter 37a. The timing controller 22c generates the timing signal $S_1$ shown in FIG. 16A, the first mask timing signal $M_1$ shown in FIG. 16B, and the second mask timing signal $M_2$ shown in FIG. 16D based on the input data MD and the preset data PD. Here, it is assumed that signal delays occur in the first mask timing signal $M_1$ in the periods of times t1 to t2 and time t11 to t12 shown in FIG. 16B when the first mask timing signal $M_1$ passes in the signal lines 5. It is assumed that signal delays occur in the second mask timing signal $M_2$ in periods of times t4 to t5 and time t14 to t15 shown in FIG. 16D when the second mask timing signal $M_2$ passes in the signal lines 5.

(B) The AND circuit 25 executes the AND operation of the timing signal $S_1$ and the first mask timing signal $M_1$. The OR circuit 26 executes the OR operation of the timing signal $S_1$ and the second mask timing signal $M_2$ as shown in FIG. 16E. The output signal $S_2$ of the first AND circuit 25 is supplied to the first switch 33b. The output signal $S_3$ of the OR circuit 26 is supplied to the second switch 34c.

(C) The first switch 33b is turned on in the high level periods of the output signal $S_2$ of the first AND circuit 25, i.e. the periods of time t3 to t6, time t7 to t8, and time t9 to t10 shown in FIG. 16C. On the other hand, the second switch 34c is turned on in the high level periods of the output signal $S_3$ of the OR circuit 26, i.e. the periods of time t1 to t6, time t7 to t8, and time t9 to t10 shown in FIG. 16E. As a result, the electric current value of the laser drive electric current $I_{LD}$ becomes equal to the electric current value of the second drive electric current $I_2$ in the periods of time t1 to t3 and time t13 to t15 as shown in FIG. 16F. The electric current value of the laser drive electric current $I_{LD}$ becomes equal to the sum of each electric current value of the first drive electric current $I_1$ and the second drive electric current $I_2$ in the periods of time t3 to t6, time t7 to t8, and time t9 to t10.

As described above, with the laser controller 10g according to the third embodiment, by setting the signal delay in generating the output signal $S_2$ of the first AND circuit 25 and the signal delay in generating the output signal $S_3$ of the OR circuit 26 equally, it is possible to control the laser with very high precision. Therefore, the laser controller 10g and the optical disk drive according to the third embodiment can perform recording operation with very high reliability when the signal delay occurs.

Fourth Embodiment

Figure 17:
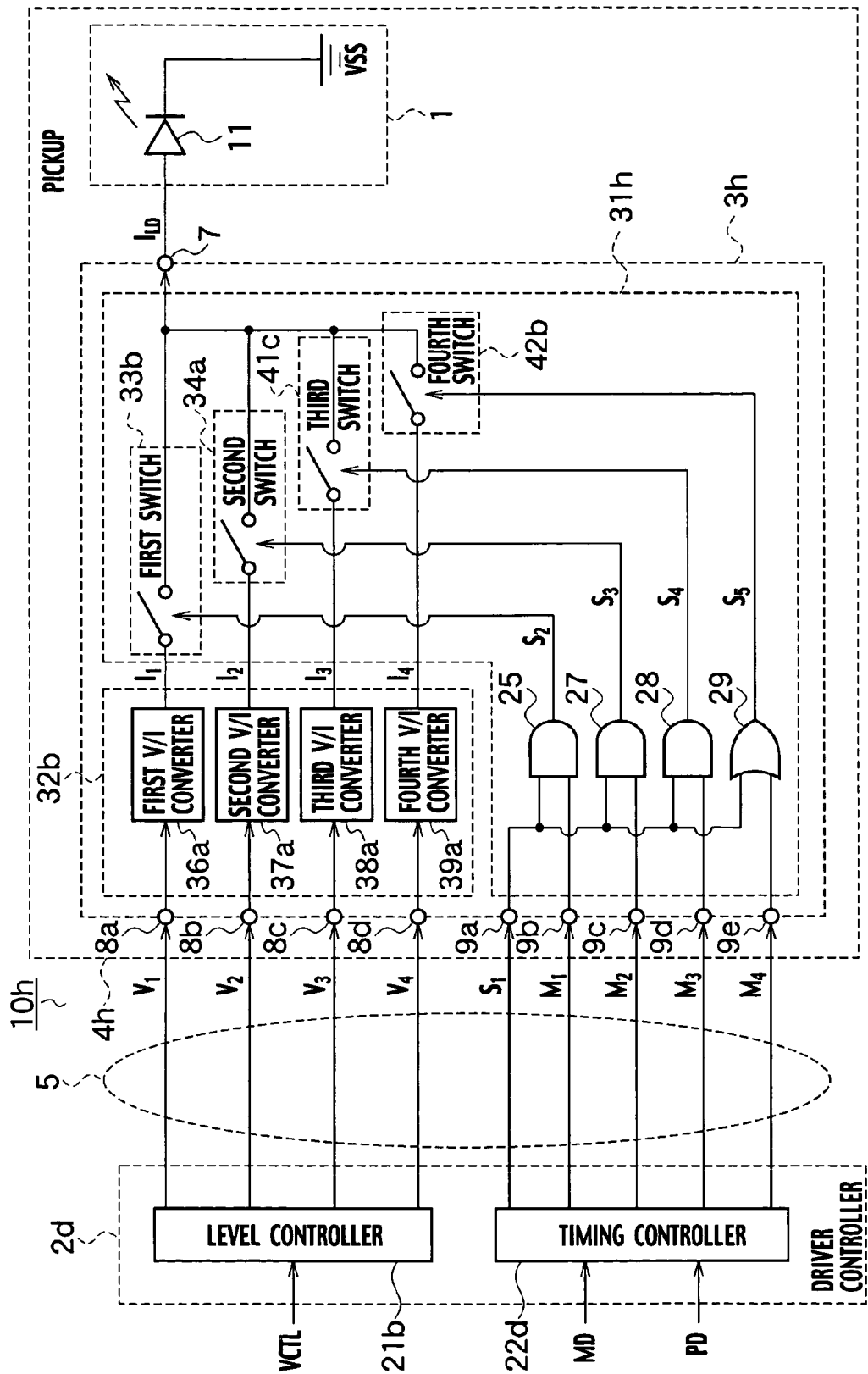
FIG. 17 is a block diagram showing a laser controller according to a fourth embodiment of the present invention.

As shown in FIG. 17, a laser controller 10h according to a fourth embodiment of the present invention is different from the driver controller 2a shown in FIG. 2 in that driver controller 2d further generates second to fourth mask timing signals $M_2$ to $M_4$ for masking the timing signal $S_1$. The pickup 4h executes arithmetic processing of the timing signal $S_1$ and the first to fourth mask timing signals $M_1$ to $M_4$. The level controller 21b further supplies a third electric current setting signal $V_3$ and a fourth electric current setting signal $V_4$ to the electric current generator 32b. The electric current generator 32b differs from the electric current generator 32a shown in FIG. 2 in that the electric current generator 32b further includes a third V/I converter 38a and a fourth V/I converter 39a. The third V/I converter 38a is connected to a third setting signal terminal 8c, and converts the third electric current setting signal $V_3$ into a third drive electric current $I_3$. The fourth V/I converter 39a is connected to a fourth setting signal terminal 8d, and converts the fourth electric current setting signal $V_4$ into a fourth drive electric current $I_4$.

The electric current controller 31h includes the first switch 33b, the second switch 34a, the third switch 41c, the fourth switch 42b, the first AND circuit 25, the second AND circuit 27, the third AND circuit 28, and the OR circuit 29. The first switch 33b is connected between the first V/I converter 36a and the electric current outputting terminal 7. The second switch 34a is connected between the second V/I converter 37a and the electric current outputting terminal 7. The third switch 41c is connected between the third V/I converter 38a and the electric current outputting terminal 7. The fourth switch 42b is connected between the fourth V/I converter 39a and the electric current outputting terminal 7. The first AND circuit 25 has an input side connected to the timing signal terminal 9a and the first mask signal terminal 9b, and also has an output side connected to the first switch 33b. The second AND circuit 27 has an input side connected to the timing signal terminal 9a and the second mask signal terminal 9c, and also has an output side connected to the second switch 34a. The third AND circuit 28 has an input side connected to the timing signal terminal 9a and the third mask signal terminal 9d, and also has an output side connected to the third switch 41c. The OR circuit 29 has an input side connected to the timing signal terminal 9a and the fourth mask signal terminal 9e, and also has an output side connected to the fourth switch 42b.

The first AND circuit 25 executes the AND operation of the timing signal $S_1$ and the first mask timing signal $M_1$. The second AND circuit 27 executes the AND operation of the timing signal $S_1$ and the second mask timing signal $M_2$. The third AND circuit 28 executes the AND operation of the timing signal $S_1$ and the third mask timing signal $M_3$. The OR circuit 29 executes the OR operation of the timing signal $S_1$ and the fourth mask timing signal $M_4$. The first switch 33b performs switching to supply the first drive electric current $I_1$ to the laser unit 1 in accordance with the output signal $S_2$ of the first AND circuit 25. The second switch 34a performs switching to supply the second drive electric current $I_2$ to the laser unit 1 in accordance with the output signal $S_3$ of the second AND circuit 27. The third switch 41c performs switching to supply the third drive electric current $I_3$ to the laser unit 1 in accordance with the output signal $S_4$ of the third AND circuit 28. The fourth switch 42b performs switching to supply the fourth drive electric current $I_4$ to the laser unit 1 in accordance with the output signal $S5$ of the OR circuit 29.

The laser driver 3h and the driver controller 2d can be monolithically integrated so as to form a semiconductor integrated circuit onto an individual semiconductor chip, the as same as FIG. 6 and FIG. 7. Other configurations are similar to the laser controller 10a shown in FIG. 2.

Figure 18:
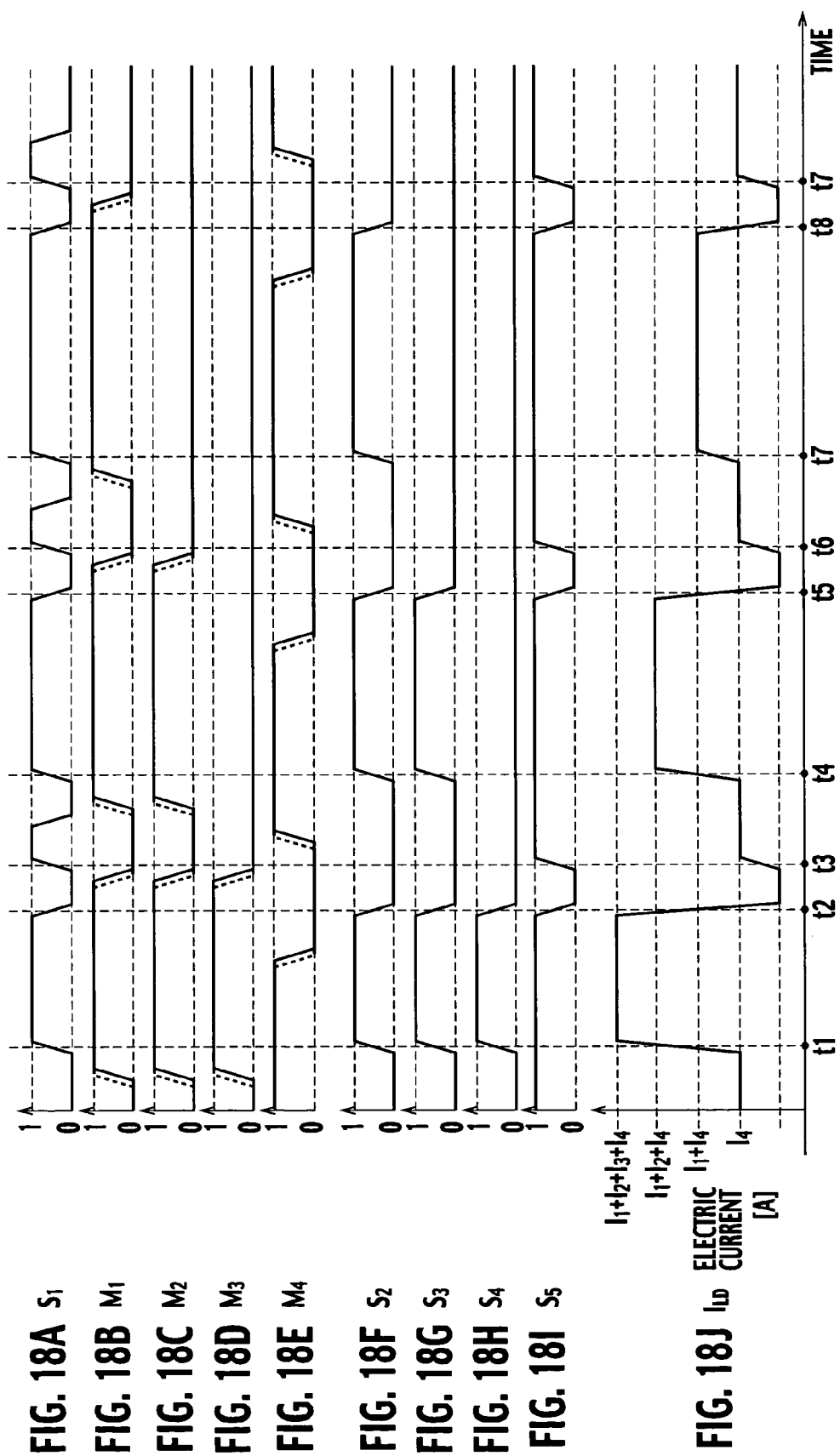
FIGS. 18A to 18J are time charts showing the operation of the laser controller according to the fourth embodiment.

Next, the operation of the laser controller 10h according to the fourth embodiment will be described by using FIG. 17 to FIG. 18J. Repeated descriptions for the same operations according to the fourth embodiment which are the same as the first embodiment are omitted.

(A) The timing controller 22d shown in FIG. 17 generates the timing signal $S_1$ shown in FIG. 18A, the first mask timing signal $M_1$ shown in FIG. 18B, the second mask timing signal $M_2$ shown in FIG. 18C, the third mask timing signal $M_3$ shown in FIG. 18D, and the fourth mask timing signal $M_4$ shown in FIG. 18E based on the input data MD and the preset data PD. Here, it is assumed that signal delays occur in the first mask timing signal $M_1$, the second mask timing signal $M_2$, the third mask timing signal $M_3$, and the fourth mask timing signal $M_4$ when the first mask timing signal $M_1$ passes in the signal lines 5.

(B) The first AND circuit 25 executes the AND operation of the timing signal $S_1$ and the first mask timing signal $M_1$ as shown in FIG. 18F. The second AND circuit 27 executes the AND operation of the timing signal $S_1$ and the second mask timing signal $M_2$ as shown in FIG. 18G The third AND circuit 28 executes the AND operation of the timing signal $S_1$ and the third mask timing signal $M_3$ as shown in FIG. 18H. The OR circuit 29 executes the OR operation of the timing signal $S_1$ and the fourth mask timing signal $M_4$ as shown in FIG. 18I.

(C) The first switch 33b is turned on in the high level periods of the output signal $S_2$ of the first AND circuit 25, i.e. the periods of time t1 to t2, time t4 to t5, and time t7 to t8 shown in FIG. 18F. The second switch 34a is turned on in the high level periods of the output signal $S_3$ of the second AND circuit 27, i.e. the periods of time t1 to t2 and time t4 to t5 shown in FIG. 18G The third switch 41c is turned on in the high level periods of the output signal $S_4$ of the third AND circuit 28, i.e. a period of time t1 to t2 shown in FIG. 18H. The fourth switch 42b is turned on in the high level periods of the output signal $S_5$ of the OR circuit 29, i.e. the periods of time t1 to t2, time t3 to t5, and time t6 to t8 shown in FIG. 18I.

(D) As a result, an electric current value of the laser drive electric current $I_{LD}$ becomes equal to sum of the electric current values of the first drive electric current $I_1$, the second drive electric current $I_2$, the third drive electric current $I_3$, and the fourth drive electric current $I_4$ in a period of time t1 to t2 shown in FIG. 18J. The electric current value of the laser drive electric current $I_{LD}$ becomes equal to sum of the electric current values of the first drive electric current $I_1$, the second drive electric current $I_2$, the third drive electric current $I_3$, and the fourth drive electric current $I_4$ in a period of time t1 to t2 shown in FIG. 18J. The electric current value of the laser drive electric current $I_{LD}$ becomes equal to sum of the electric current values of the first drive electric current $I_1$, the second drive electric current $I_2$, and the fourth drive electric current $I_4$ in periods of time t3 to t4 and time t6 to t7 shown in FIG. 18J. The electric current value of the laser drive electric current $I_{LD}$ becomes equal to sum of the electric current values of the first drive electric current $I_1$ and the fourth drive electric current $I_4$ in a period of time t7 to t8 shown in FIG. 18J.

As described above, with the laser controller 10h according to the fourth embodiment, it is possible to switch the electric current value of the laser drive electric current $I_{LD}$ of a five pattern even if a signal delay caused by signal lines 5 occurs. Therefore, it is possible to increase the precision of complex laser control.

Fifth Embodiment

Figure 19:
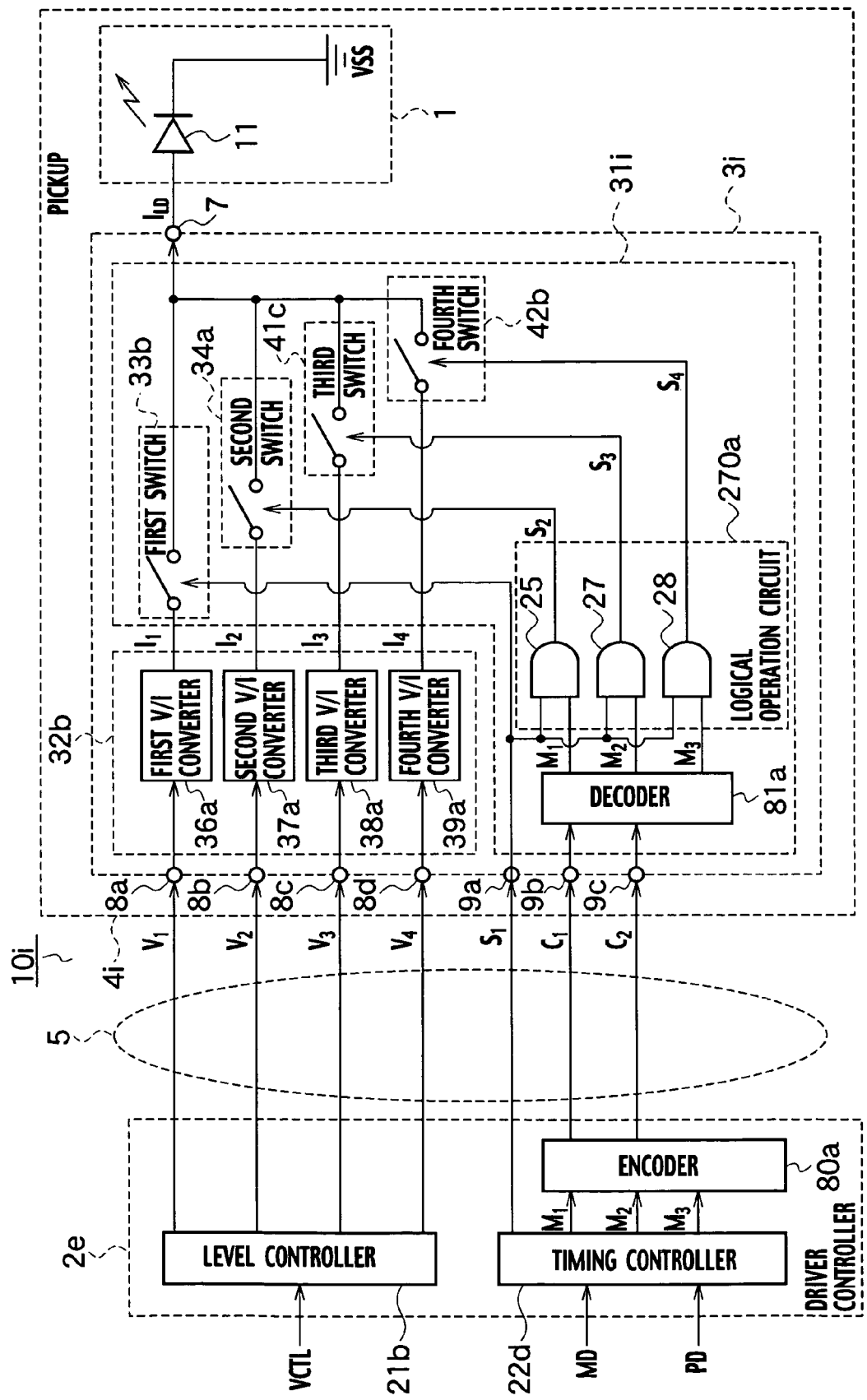
FIG. 19 is a block diagram showing a laser controller according to a fifth embodiment of the present invention.
Figure 21:
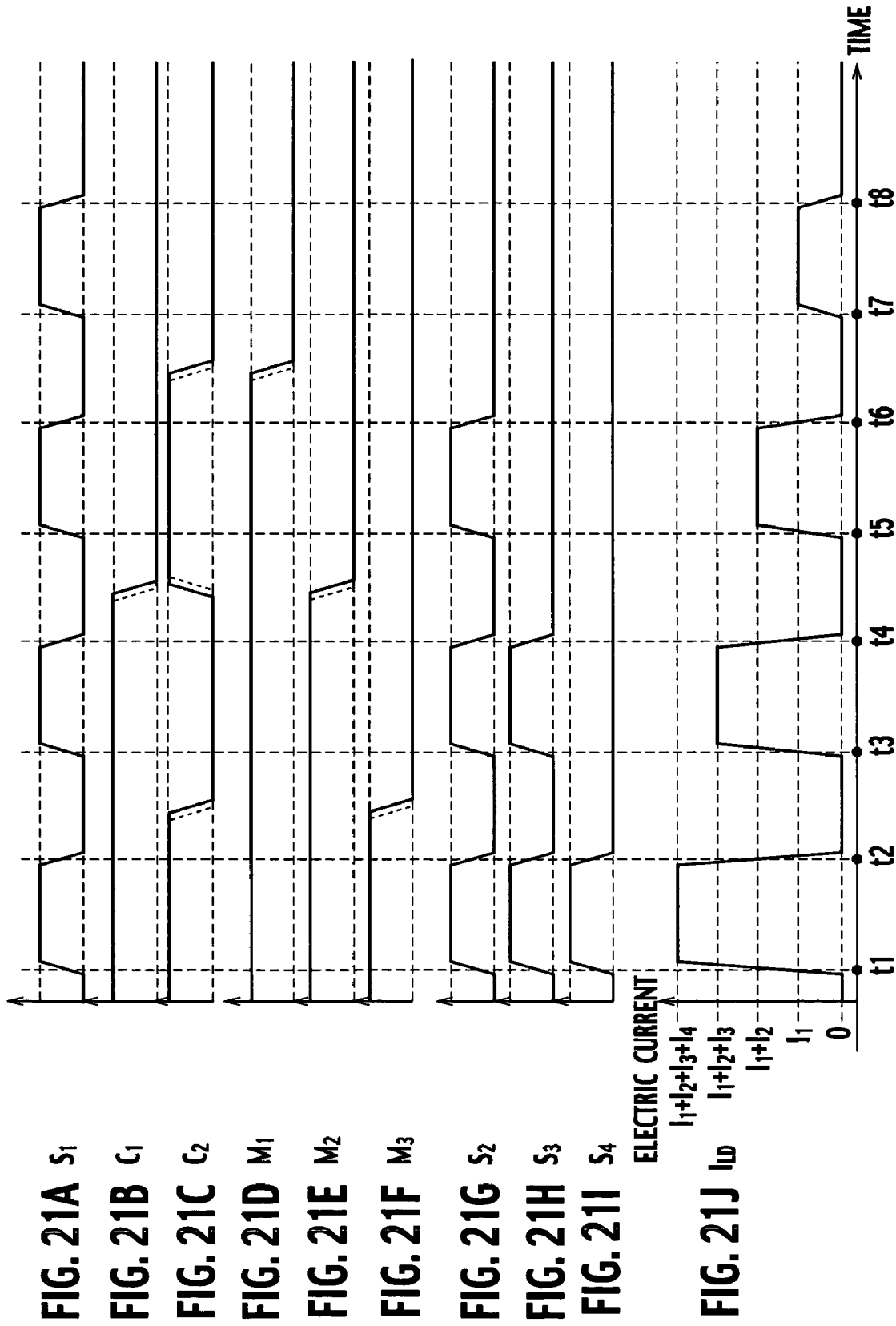
FIGS. 21A to 21J are time charts showing the operation of the laser controller according to the fifth embodiment of the present invention.

As shown in FIG. 19, a laser controller 10i according to a fifth embodiment of the present invention is different from FIG. 2 and FIG. 17 in that driver controller 2e further includes an encoder configured to encode all of the mask timing signals $M_1$ to $M_3$. The electric current controller 31i further includes a decoder 81a and a logical operation circuit 270a. The decoder 81a decodes encoded mask timing signals $M_1$ to $M_3$. The logical operation circuit 270a executes arithmetic processing of the timing signal $S_1$ and the decoded mask timing signals $M_1$ to $M_3$.

Furthermore, the logical operation circuit 270a includes a first AND circuit 25, a second AND circuit 27, and a third AND circuit 28. The first AND circuit 25 executes an AND operation of the timing signal $S_1$ and the decoded first mask timing signal $M_1$. The second AND circuit 27 executes an AND operation of the timing signal $S_1$ and the decoded second mask timing signal $M_2$. The third AND circuit 28 executes an AND operation of the timing signal $S_1$ and the decoded third mask timing signal $M_3$.

When increasing in output level of the laser increases a number of signal lines 5, the radiation noise and implementation areas of the signal lines 5 are increased. The encoder 80a and decoder 81a prevent signal lines 5 from increasing by encoding and decoding the mask timing signal $M_1$ to $M_3$ based on the relationship shown in FIG. 20.

The laser driver 3i and the driver controller 2e can be monolithically integrated so as to form a semiconductor integrated circuit onto an individual semiconductor chip, the as same as FIG. 6 and FIG. 7. Other configurations are similar to FIG. 1 and FIG. 17.

Next, the operation of the laser controller 10i according to the fifth embodiment will be described by using FIG. 19 to FIG. 21J. Repeated descriptions for the same operations according to the fifth embodiment which are the same as the first embodiment are omitted.

(A) The timing controller 22d shown in FIG. 19 generates the timing signal $S_1$ FIG. 21A and the first to third mask timing signals $M_1$ to $M_3$ shown in FIG. 21E to FIG. 21F based on the input data MD and the preset data PD. The encoder 80a shown in FIG. 19 encodes the first to third mask timing signals $M_1$ to $M_3$ based on the relationship shown in FIG. 20. As a result, a first encode signal $C_1$ shown in FIG. 21B and a second encode signal $C_2$ shown in FIG. 21C are generated. The first encode signal $C_1$ and the second encode signal $C_2$ are transmitted to the decoder 81a via the signal lines 5. As shown in FIG. 21A to FIG. 21C, each change in timing of the first encode signal $C_1$ and the second encode signal $C_2$ is different from each other.

(B) The decoder 81a decodes the encoded first to third mask timing signals $M_1$ to $M_3$, i.e., the first and second encode signals $C_1$ and $C_2$. In a period of time t1 to t2, since the first encode signal $C_1$ shown in FIG. 21B and the second encode signal $C_2$ shown in FIG. 21C are high levels, the first mask timing signal $M_1$ shown in FIG. 21D, the second mask timing signal $M_2$ shown in FIG. 21E, and the third mask timing signal $M_3$ shown in FIG. 21F are set to a high level.

Figure 20:
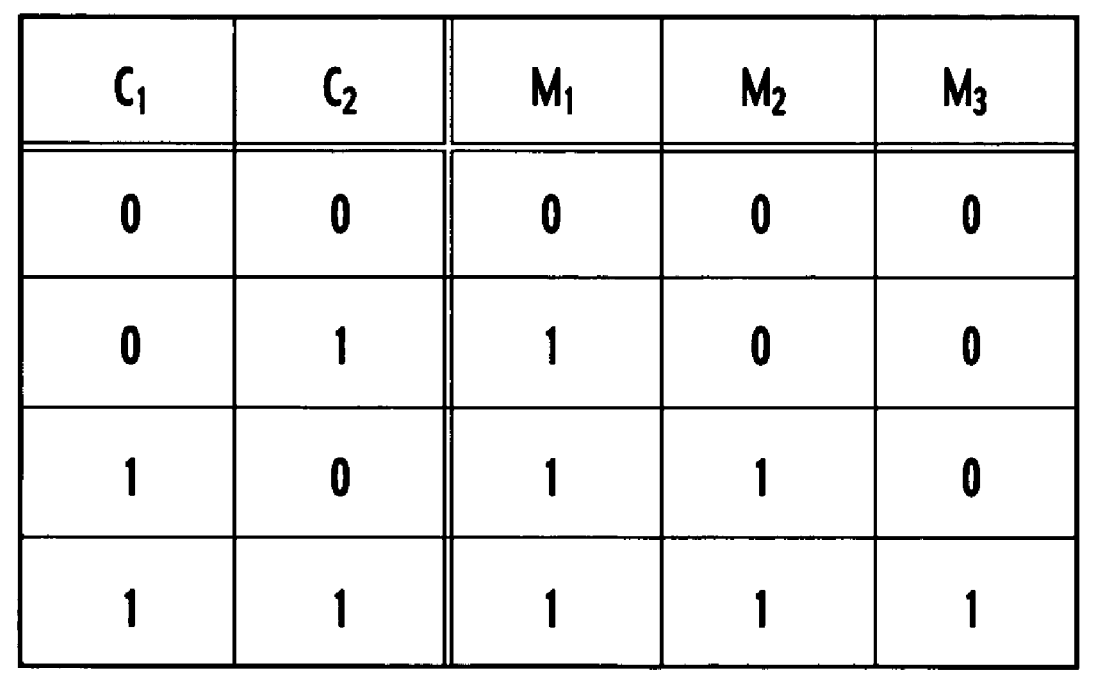

(C) Similarly, in a period of time t3 to t4, since the first encode signal $C_1$ is a high level and the second encode signal $C_2$ is a low level, the first and second mask timing signals $M_1$ and $M_2$ are set to high level, and the third mask timing signal $M_3$ is set to low level based on the relationship shown in FIG. 20. In a period of time t7 to t8, since the first and second encode signals $C_1$ are low levels, the first to third mask timing signals $M_1$ to $M_3$ are set to a low level.

(D) As shown in FIG. 21G, the first AND circuit 25 shown in FIG. 19 executes the AND operation of the timing signal $S_1$ shown in FIG. 21A and the first mask timing signal $M_1$ shown in FIG. 21D. As shown in FIG. 21H, the second AND circuit 27 executes the AND operation of the timing signal $S_1$ and the second mask timing signal $M_2$. As shown in FIG. 21I, the third AND circuit 28 executes the AND operation of the timing signal $S_1$ and the third mask timing signal $M_3$.

(E) The first switch 33b shown in FIG. 19 is turned on in the high level periods of the timing signal $S_1$, i.e. the periods of time t1 to t2, time t3 to t4, time t5 to t6, and time t7 to t8. The second switch 34a is turned on in the high level periods of the output signal $S_2$ of the first AND circuit 25, i.e. the periods of time t1 to t2, time t3 to t4, and time t5 to t6. The third switch 41c is turned on in the high level periods of the output signal $S_3$ of the second AND circuit 27, i.e. the periods of time t1 to t2 and time t3 to t4. The fourth switch 42b is turned on in the high level periods of the output signal $S_4$ of the third AND circuit 28, i.e. the periods of time t1 to t2.

(F) As a result, an electric current value of the laser drive electric current $I_{LD}$ becomes equal to sum of the electric current values of the first drive electric current $I_1$, the second drive electric current $I_2$, the third drive electric current $I_3$, and the fourth drive electric current $I_4$ in a period of time t1 to t2 shown in FIG. 21J. The electric current value of the laser drive electric current $I_{LD}$ becomes equal to sum of the electric current values of the first drive electric current $I_1$, the second drive electric current $I_2$, and the third drive electric current $I_3$ in a period of time t3 to t4 shown in FIG. 21J. The electric current value of the laser drive electric current $I_{LD}$ becomes equal to sum of the electric current values of the first drive electric current $I_1$ and the second drive electric current $I_2$ in a period of time t5 to t6 shown in FIG. 21J. The electric current value of the laser drive electric current $I_{LD}$ becomes equal to the electric current value of the first drive electric current $I_1$ in a period of time t7 to t8 shown in FIG. 21J. The laser drive electric current $I_{LD}$ is supplied to the laser diode 11 shown in FIG. 19.

As described above, with the laser controller 10$i$ according to the fifth embodiment, it is possible to decrease the number of the signal lines 5 by adding the encoder 80$a$ to the driver controller 2$e$ and the decoder 81$a$ to the electric current controller 31$i$. Moreover, it is possible to control an output level of the laser even if phase errors occur in the timing signal $S_1$, first encode signal $C_1$, and the second encode signal $C_2$ in transmitting the timing signal $S_1$, first encode signal $C_1$, and the second encode signal $C_2$ to the pickup 4$i$ via the signal lines 5.

(First Modification of Fifth Embodiment)

Figure 22:
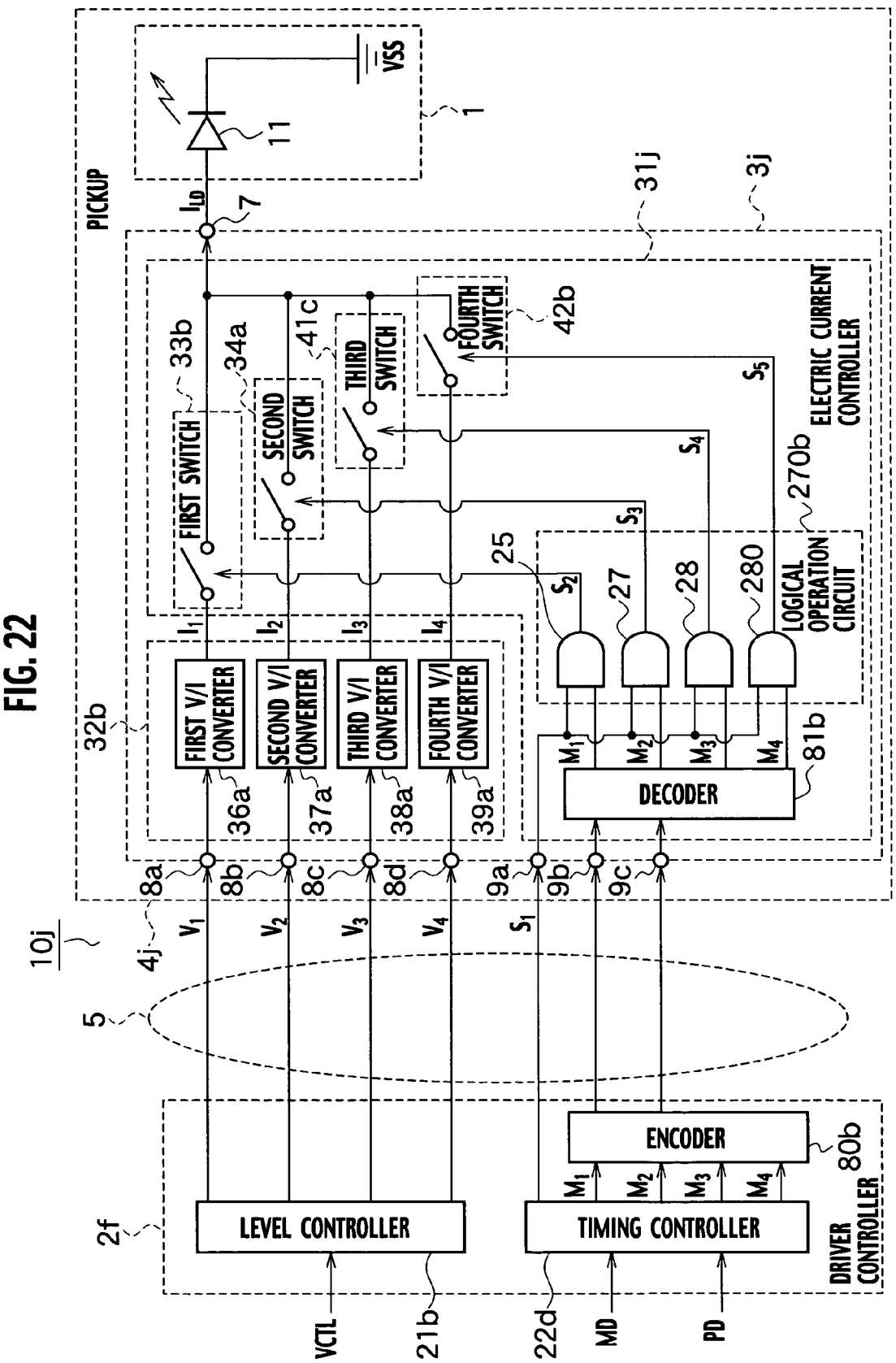
FIG. 22 is a block diagram showing a laser controller according to a first modification of the fifth embodiment.
Figure 24:
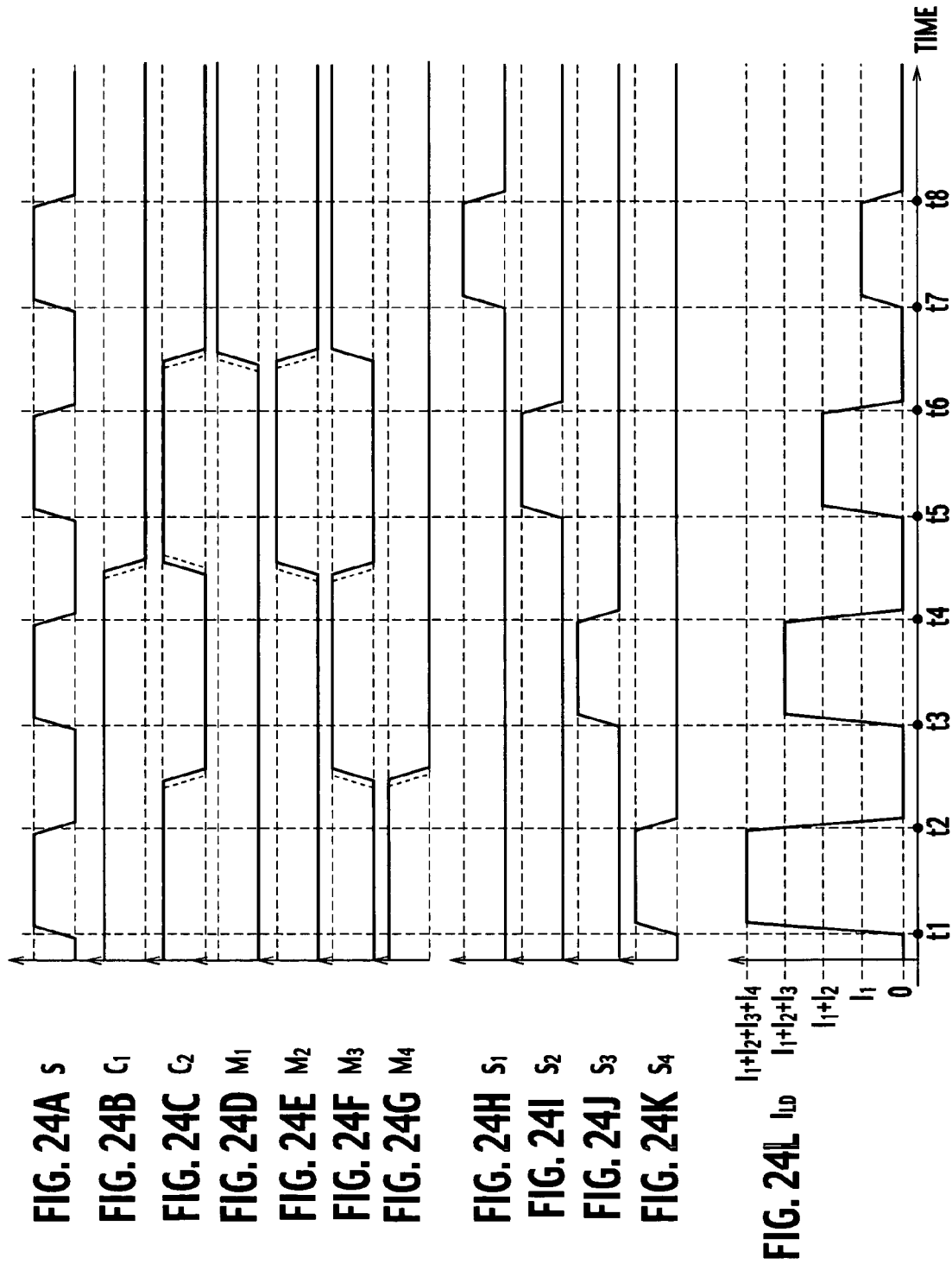
FIGS. 24A to 24L are time charts showing the operation of the laser controller according to the first modification of the fifth embodiment.

As shown in FIG. 22, as a laser controller 10$j$ according to a first modification of the fifth embodiment, the encoder 80$b$ may encode four mask timing signals, i.e., first to fourth mask timing signals $M_1$ to $M_4$ in accordance with the relationship shown in FIG. 23. The decoder 81$b$ decodes the first and second encode signals $C_1$ and $C_2$ shown in FIG. 24B and FIG. 24C in accordance with the relationship shown in FIG. 23. The electric current controller 31$j$ further includes a fourth AND circuit 280 configured to execute an AND operation of the encoded fourth mask timing signal $M_4$ shown in FIG. 24G and the timing signal $S_1$ shown in FIG. 24A.

In the electric current controller 31$i$ shown in FIG. 19, small signal delay is generated in the decoding, and the arithmetic processing of the first and second encode signals $C_1$ and $C_2$. As a result, timing errors are generated in the timing signal $S_1$, the output signal $S_2$ of the first AND circuit 25, the output signal $S_3$ of the second AND circuit 27, and the output signal $S_4$ of the third AND circuit 28. On the other hand, the electric current controller 31$j$ shown in FIG. 22 controls the first switch 33$b$, the second switch 34$a$, the third switch 41$c$, and the fourth switch 42$b$ by using the results of the AND operation.

Accordingly, by controlling the first switch 33$b$, the second switch 34$a$, the third switch 41$c$, and the fourth switch 42$b$ by using the results of the AND operation, it is possible to control the first switch 33$b$, the second switch 34$a$, the third switch 41$c$, and the fourth switch 42$b$ with high precision.

(Second Modification of Fifth Embodiment)

Figure 25:
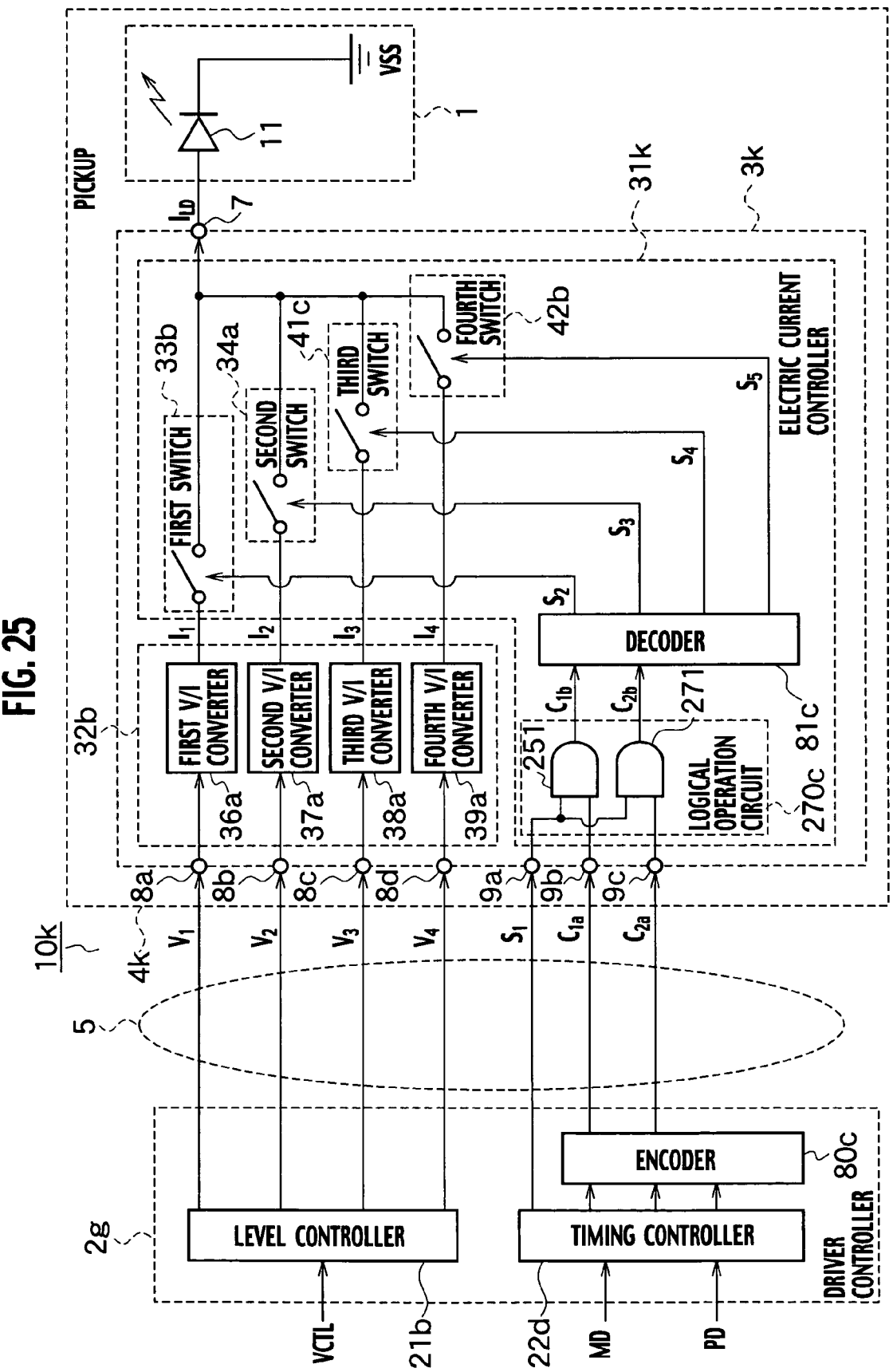
FIG. 25 is a block diagram showing a laser controller according to a second modification of the fifth embodiment.

As shown in FIG. 25, as a laser controller 10$k$ according to a second modification of the fifth embodiment, the electric current controller 31$k$ decodes the first and second encode signals $C_{1a}$ and $C_{2a}$ after performing arithmetic processing in accordance with the relationship shown in FIG. 26. That is, the electric current controller 31$k$ includes a first AND circuit 251, a second AND circuit 271, and a decoder 81$c$. The first AND circuit 251 is connected to the timing signal terminal 9$a$ and the first mask signal terminal 9$b$. The second AND circuit 271 is connected to the timing signal terminal 9$a$ and the second mask signal terminal 9$c$. The decoder 81$c$ has an input side connected to the first AND circuit 251 and the second AND circuit 271, and also has an output side connected to first to fourth switches 33$b$, 34$a$, 41$c$, and 42$b$. A logical operation circuit 270$c$ is constituted by the first AND circuit 251 and the second AND circuit 271.

Figure 27:
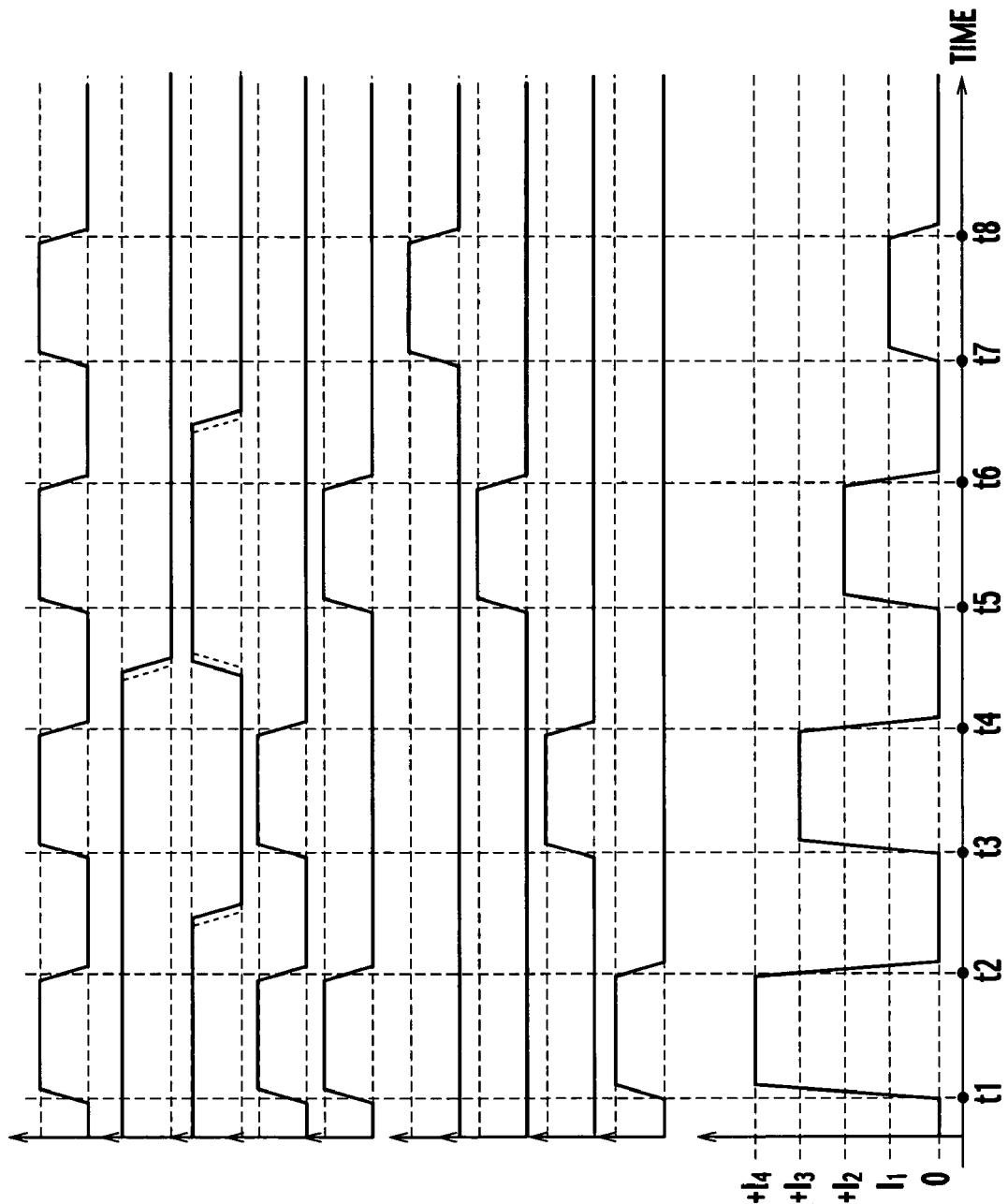
FIGS. 27A to 27J are time charts showing the operation of the laser controller according to the second modification of the fifth embodiment.

The first AND circuit 251 includes an AND operation to the timing signal $S_1$ shown in FIG. 27A and the first encode signal $C_{1a}$ shown in FIG. 27B. The second AND circuit 271 includes an AND operation to timing signal $S_1$ and the second encode signal $C_{2a}$ shown in FIG. 27C. The decoder 81$c$ decodes the output signal $C_{1b}$ of the first AND circuit 251 shown in FIG. 27D and the output signal $C_{2b}$ of the second AND circuit 271 shown in FIG. 27E by using the relationship shown in FIG. 26. The output signals $S_2$ to $S_5$ of the decoder 81$c$ shown in FIG. 27F to FIG. 27I are supplied to the first to fourth switches 33$b$, 34$a$, 41$c$, and 42$b$. As a result, laser drive electric current $I_{LD}$ shown in FIG. 27J is generated.

As described above, laser controller 10$k$ according to the second modification of the fifth embodiment, it is possible to control the first switch 33$b$, the second switch 34$a$, the third switch 41$c$, and the fourth switch 42$b$ with high precision, the as same as the laser controller 10$j$ shown in FIG. 22.

Sixth Embodiment

Figure 28:
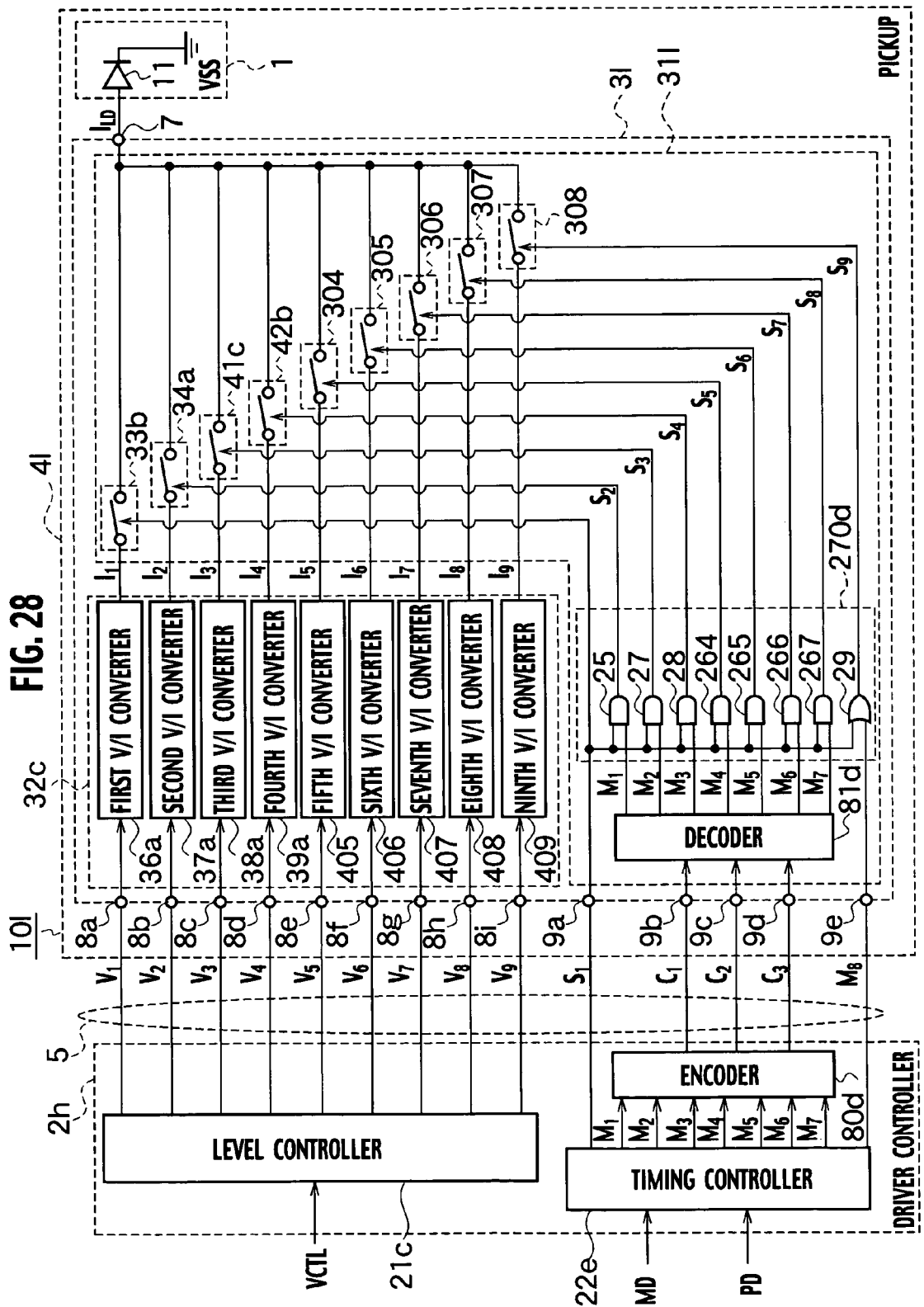
FIG. 28 is a block diagram showing a laser controller according to a sixth embodiment of the present invention.

As shown in FIG. 28, a laser controller 101 according to a sixth embodiment of the present invention is different from FIG. 2 and FIG. 19 in that the laser controller 101 further includes fifth to ninth setting signal terminals 8$e$ to 8$i$, fifth to ninth V/I converters 405 to 409, fourth to seventh AND circuits 264 to 267, fifth to ninth switches 304 to 308, and an OR circuit 29. The encoder 80$d$ encodes part of the mask timing signals $M_1$ to $M_8$ in accordance with the relationship shown in FIG. 29.

The fifth V/I converter 405 is connected between the fifth setting signal terminal 8$e$ and the fifth switch 304. The sixth V/I converter 406 is connected between the sixth setting signal terminal 8$f$ and the sixth switch 305. The seventh V/I converter 407 is connected between the seventh setting signal terminal 8$g$ and the seventh switch 306. The eighth V/I converter 408 is connected between the eighth setting signal terminal 8$h$ and the eighth switch 307. The ninth V/I converter 409 is connected between the ninth setting signal terminal 8$i$ and the ninth switch 308.

Furthermore, the fourth AND circuit 264 has an input side connected to the timing signal terminal 9$a$ and the decoder 81$d$, and also has an output side connected to the fifth switch 304. The fifth AND circuit 265 has an input side connected to the timing signal terminal 9$a$ and the decoder 81$d$, and also has an output side connected to the sixth switch 305. The sixth AND circuit 266 has an input side connected to the timing signal terminal 9$a$ and the decoder 81$d$, and also has an output side connected to the seventh switch 306. The seventh AND circuit 267 has an input side connected to the timing signal terminal 9$a$ and the decoder 81$d$, and also has an output side connected to the eighth switch 307. The OR circuit 29 has an input side connected to the timing signal terminal 9$a$ and the fourth mask signal terminal 9$e$, and also has an output side connected to the ninth switch 308.

The laser driver 31 and the driver controller 2$h$ can be monolithically integrated so as to form a semiconductor integrated circuit onto an individual semiconductor chip, the as same as FIG. 6 and FIG. 7. Other configurations are similar to FIG. 1 and FIG. 19.

Next, the operation of the laser controller 101 according to the sixth embodiment will be described by using FIG. 28 to FIG. 30V. Repeated descriptions for the same operations according to the sixth embodiment which are the same as the first embodiment are omitted.

(A) The timing controller 22$e$ shown in FIG. 28 generates the timing signal $S_1$ FIG. 21A and the first to eighth mask timing signals $M_1$ to $M_8$ shown in FIG. 30A to FIG. 30M based on the input data MD and the preset data PD. The encoder 80$a$ shown in FIG. 28 encodes the first to seventh mask timing signals $M_1$ to $M_7$ based on the relationship shown in FIG. 29. As a result, first to third encode signals $C_1$ to $C_3$ shown in FIG. 30B to FIG. 30C are generated. The first to third encode signals $C_1$ to $C_3$ are transmitted to the decoder 81$d$ via the signal lines 5. The decoder 81$d$ decodes the first to third encode signals $C_1$ to $C_3$ in accordance with the relationship shown in FIG. 29. When the decoder 81d decodes the first to third encode signals $C_1$ to $C_3$, first to eighth mask timing signals $M_1$ to $M_8$ shown in FIG. 30E to FIG. 30L are generated.

(B) As shown in FIG. 30N, the first AND circuit 25 shown in FIG. 28 executes an AND operation of the timing signal $S_1$ and the first mask timing signal $M_1$ shown in FIG. 30F. As shown in FIG. 30O, the second AND circuit 27 executes an AND operation of the timing signal $S_1$ and the second mask timing signal $M_2$ shown in FIG. 30G As shown in FIG. 30P, the third AND circuit 28 executes an AND operation of the timing signal $S_1$ and the third mask timing signal $M_3$ shown in FIG. 30H. As shown in FIG. 30Q, the fourth AND circuit 264 executes an AND operation of the timing signal $S_1$ and the fourth mask timing signal $M_4$ shown in FIG. 30I. As shown in FIG. 30R, the fifth AND circuit 265 executes an AND operation of the timing signal $S_1$ and the fifth mask timing signal $M_5$ shown in FIG. 30J. As shown in FIG. 30S, the sixth AND circuit 266 executes an AND operation of the timing signal $S_1$ and the sixth mask timing signal $M_6$ shown in FIG. 30K. As shown in FIG. 30T, the seventh AND circuit 267 executes an AND operation of the timing signal $S_1$ and the seventh mask timing signal $M_7$ shown in FIG. 30L. As shown in FIG. 30U, the OR circuit 29 executes an OR operation of the timing signal $S_1$ and the eighth mask timing signal $M_8$ shown in FIG. 30E.

(C) The first switch 33b shown in FIG. 28 is turned on in the high level periods of the timing signal $S_1$, i.e. the periods of time t1 to t2, time t4 to t5, time t7 to t8, time t10 to t11, time t13 to t14, time t16 to t17, time t19 to t2O, and time t22 to t23. The second switch 34a is turned on in the high level periods of the output signal $S_2$ of the first AND circuit 25, i.e. the periods of time t1 to t2, time t4 to t5, time t7 to t8, time t10 to t11, time t13 to t14, time t16 to t17, and time t19 to t20. The third switch 41c is turned on in the high level periods of the output signal $S_3$ of the second AND circuit 27, i.e. the periods of time t1 to t2, time t4 to t5, time t7 to t8, time t10 to t11, time t13 to t14, and time t16 to t17. The fourth switch 42b is turned on in the high level periods of the output signal $S_4$ of the third AND circuit 28, i.e. the periods of time t1 to t2, time t4 to t5, time t7 to t8, time t10 to t11, and time t13 to t14. The fifth to ninth switches 304 to 308 operate similar to the first to fourth switches 33b, 34a, 41c, and 42b. As a result, the electric current waveform of the laser drive electric current $I_{LD}$ becomes the waveform shown in FIG. 30V. The laser drive electric current $I_{LD}$ is supplied to the laser diode 11 shown in FIG. 28.

As described above, with the laser controller 101 according to the sixth embodiment, it is possible to control $2^n$ laser output levels by a maximum when the encoded mask timing signals are n [bit]. Therefore, it is possible to suppress increase in the number of the signal lines 5 even if laser output levels become very multiple.

Other Embodiments

Various modifications will become possible for those skilled in the art after receiving the teachings of the present disclosure without departing from the scope thereof.

With respect to aforementioned first to sixth embodiments, description was given of an example in which the timing controllers 22a to 22e are constituted by using the decoder 230. However, individual pulse generator for generating timing signal $S_1$ and mask timing signals may be included instead of the decoder 230. Furthermore, a plurality of timing signal lines can be used in accordance with an increase in the complexity of the laser control.

In the operational explanation of the laser controller 10a to 10h according to first to fourth embodiments, description was given of an example in which the signal delays occur in the mask timing signals. However, it is possible to control the laser with high precision even if the signal delays occur in the timing signal $S_1$.

Moreover, the aforementioned laser controllers 10a to 101 according to the first to sixth embodiments can be used for various recordable optical disk drives such as compact disk-recordable/rewritable (CD-R/RW) drives, digital versatile disk (DVD)-R/RW drives, DVD+R/RW drives, and next generation optical disk drives.

What is claimed is:

1. A laser controller for controlling a laser drive electric current to be supplied to a laser unit by adding a plurality of drive electric currents, the laser controller comprising:

a timing signal generator configured to generate a timing signal for controlling the number of additions of the drive electric currents, in accordance with input data;

a mask signal generator configured to generate a mask timing signal for controlling the number of additions of the drive electric currents, and for masking a part of the timing signal, in accordance with the input data;

an electric current generator configured to convert a current setting signal for setting the laser drive electric current into the drive electric currents;

an arithmetic processing circuit configured to execute arithmetic processing of the timing signal and the mask timing signal, and to generate a result of the arithmetic processing as an output signal; and a controller configured to control whether at least one of the drive electric currents are added, in accordance with the output signal, wherein the mask signal generator shifts a pulse width of the mask timing signal by an offset time, and sets a timing of change of a logical level of the mask timing signal to a timing different from a timing of change of a logical level of the timing signal, and the laser drive electric current is changed at a timing of change of a logical level of the timing signal or the mask timing signal, wherein the arithmetic processing circuit performs at least an AND operation of the timing signal and the mask timing signal as the arithmetic processing.

2. A laser controller for controlling a laser drive electric current to be supplied to a laser unit by adding a plurality of drive electric currents, the laser controller comprising:

a timing signal generator configured to generate a timing signal for controlling the number of additions of the drive electric currents, in accordance with input data;

a mask signal generator configured to generate a mask timing signal for controlling the number of additions of the drive electric currents, and for masking a part of the timing signal, in accordance with the input data;

an electric current generator configured to convert a current setting signal for setting the laser drive electric current into the drive electric currents;

an arithmetic processing circuit configured to execute arithmetic processing of the timing signal and the mask timing signal, and to generate a result of the arithmetic processing as an output signal; and a controller configured to control whether at least one of the drive electric currents are added, in accordance with the output signal, wherein the mask signal generator shifts a pulse width of the mask timing signal by an offset time, and sets a timing of change of a logical level of the mask timing signal to a timing different from a timing of change of a logical level of the timing signal, and the laser drive electric current is changed at a timing of change of a logical level of the timing signal or the mask timing signal, wherein the arithmetic processing circuit performs at least an OR operation of the timing signal and the mask timing signal as the arithmetic processing.

3. The laser controller of any one of claims 1 and 2, wherein the mask signal generator generates a plurality of mask timing signals, and the arithmetic processing circuit receives the mask timing signals, and executes the arithmetic processing of the timing signal and the mask timing signals.

4. The laser controller of claim 3, further comprising:

an encoder configured to encode a part of or all of the mask timing signals;

a decoder configured to decode the mask timing signals, wherein the arithmetic processing circuit executes the arithmetic processing of the timing signal and the decoded mask timing signals.

5. The laser controller of claim 3, further comprising:

an encoder configured to encode a part of or all of the mask timing signals; and a decoder configured to decode the result of the arithmetic processing.

6. A laser controller for controlling a laser drive electric current to be supplied to a laser unit by adding a plurality of drive electric currents, the laser controller comprising:

first and second semiconductor devices; and signal lines which connect the first and second semiconductor devices, wherein the first semiconductor device includes:

a timing signal generator configured to generate a timing signal for controlling the number of additions of the drive electric currents, in accordance with input data; and a mask signal generator configured to generate a mask timing signal for controlling the number of additions of the drive electric currents, and for masking a part of the timing signal, in accordance with the input data, wherein the second semiconductor device includes:

an electric current generator configured to convert a current setting signal for setting the laser drive electric current into the drive electric currents;

an arithmetic processing circuit configured to execute arithmetic processing of the timing signal and the mask timing signal, and to generate a result of the arithmetic processing as an output signal; and a controller configured to control whether at least one of the drive electric currents are added, in accordance with the output signal, wherein the mask signal generator shifts a pulse width of the mask timing signal by an offset time, and sets a timing of change of a logical level of the mask timing signal to a timing different from a timing of change of a logical level of the timing signal, the laser drive electric current is changed at a timing of change of a logical level of the timing signal or the mask timing signal, and the arithmetic processing circuit performs at least an AND operation of the timing signal and the mask timing signal as the arithmetic processing.

7. A laser controller for controlling a laser drive electric current to be supplied to a laser unit by adding a plurality of drive electric currents, the laser controller comprising:

first and second semiconductor devices; and signal lines which connect the first and second semiconductor devices, wherein the first semiconductor device includes:

a timing signal generator configured to generate a timing signal for controlling the number of additions of the drive electric currents, in accordance with input data; and a mask signal generator configured to generate a mask timing signal for controlling the number of additions of the drive electric currents, and for masking a part of the timing signal, in accordance with the input data, wherein the second semiconductor device includes:

an electric current generator configured to convert a current setting signal for setting the laser drive electric current into the drive electric currents;

an arithmetic processing circuit configured to execute arithmetic processing of the timing signal and the mask timing signal, and to generate a result of the arithmetic processing as an output signal; and a controller configured to control whether at least one of the drive electric currents are added, in accordance with the output signal, wherein the mask signal generator shifts a pulse width of the mask timing signal by an offset time, and sets a timing of change of a logical level of the mask timing signal to a timing different from a timing of change of a logical level of the timing signal, the laser drive electric current is changed at a timing of change of a logical level of the timing signal or the mask timing signal, and the arithmetic processing circuit performs at least an OR operation of the timing signal and the mask timing signal as the arithmetic processing.

8. The laser controller of any one of claims 6 and 7, wherein the mask signal generator generates a plurality of mask timing signals.

9. The laser controller of any one of claims 6 and 7, wherein the mask signal generator encodes a part of or all of the mask timing signals.

10. The laser controller of any one of claims 6 and 7, wherein the second semiconductor device further comprises:

a decoder configured to decode the encoded mask timing signals, wherein the arithmetic processing circuit executes the arithmetic processing of the timing signal and the decoded mask timing signals.

11. The laser controller of any one of claims 6 and 7, wherein the second semiconductor device further comprises:

a decoder configured to decode the results of the arithmetic processing.

12. An optical disk drive including a laser controller for controlling a laser drive electric current to be supplied to a laser unit by adding a plurality of drive electric currents, wherein the laser controller includes:

first and second semiconductor devices; and signal lines which connect the first and second semiconductor devices, wherein the first semiconductor device includes:

a timing signal generator configured to generate a timing signal for controlling the number of additions of the drive electric currents, in accordance with input data; and a mask signal generator configured to generate a mask timing signal for controlling the number of additions of the drive electric currents, and for masking a part of the timing signal, in accordance with the input data, wherein the second semiconductor device includes:

an electric current generator configured to convert a current setting signal for setting the laser drive electric current into the drive electric currents;

an arithmetic processing circuit configured to execute arithmetic processing of the timing signal and the mask timing signal, and to generate a result of the arithmetic processing as an output signal; and a controller configured to control whether at least one of the drive electric currents are added, in accordance with the output signal, wherein the mask signal generator shifts a pulse width of the mask timing signal by an offset time, and sets a timing of change of a logical level of the mask timing signal to a timing different from a timing of change of a logical level of the timing signal, and the laser drive electric current is changed at a timing of change of a logical level of the timing signal or the mask timing signal, wherein the arithmetic processing circuit performs at least an OR operation of the timing signal and the mask timing signal as the arithmetic processing.

13. An optical disk drive including a laser controller for controlling a laser drive electric current to be supplied to a laser unit by adding a plurality of drive electric currents, wherein the laser controller includes:

first and second semiconductor devices; and signal lines which connect the first and second semiconductor devices, wherein the first semiconductor device includes:

a timing signal generator configured to generate a timing signal for controlling the number of additions of the drive electric currents, in accordance with input data; and a mask signal generator configured to generate a mask timing signal for controlling the number of additions of the drive electric currents, and for masking a part of the timing signal, in accordance with the input data, wherein the second semiconductor device includes:

an electric current generator configured to convert a current setting signal for setting the laser drive electric current into the drive electric currents;

an arithmetic processing circuit configured to execute arithmetic processing of the timing signal and the mask timing signal, and to generate a result of the arithmetic processing as an output signal; and a controller configured to control whether at least one of the drive electric currents are added, in accordance with the output signal, wherein the mask signal generator shifts a pulse width of the mask timing signal by an offset time, and sets a timing of change of a logical level of the mask timing signal to a timing different from a timing of change of a logical level of the timing signal, and the laser drive electric current is changed at a timing of change of a logical level of the timing signal or the mask timing signal, wherein the arithmetic processing circuit performs at least an AND operation of the timing signal and the mask timing signal as the arithmetic processing.

14. The optical disk drive of any one of claims 12 and 13, wherein the mask signal generator generates a plurality of mask timing signals.

15. The optical disk drive of any one of claims 12 and 13, wherein the first semiconductor device further includes an encoder configured to encode a part of or all of the mask timing signals, and the second semiconductor device further includes a decoder configured to decode the encoded mask timing signals.

16. The optical disk drive of any one of claims 12 and 13, wherein the first semiconductor device further includes an encoder configured to encode a part of or all of the mask timing signals, and the second semiconductor device further includes a decoder configured to decode the results of the arithmetic processing.

* * * * *